(12) United States Patent
Ayhan et al.

(10) Patent No.: US 12,175,875 B2
(45) Date of Patent: *Dec. 24, 2024

(54) MACHINE LEARNING SYSTEM FOR MAXIMUM SOUND PRESSURE LEVEL PREDICTION

(71) Applicant: The Boeing Company, Chicago, IL (US)

(72) Inventors: Samet M. Ayhan, Fairfax, VA (US); Mikhail Y. Danilin, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/805,371

(22) Filed: Jun. 3, 2022

(65) Prior Publication Data
US 2023/0394978 A1 Dec. 7, 2023

(51) Int. Cl.
| | |
|---|---|
| *G08G 5/00* | (2006.01) |
| *G01C 21/00* | (2006.01) |
| *G05D 1/00* | (2006.01) |
| *G06F 3/16* | (2006.01) |
| *G06N 20/00* | (2019.01) |

(52) U.S. Cl.
CPC ......... *G08G 5/0039* (2013.01); *G01C 21/005* (2013.01); *G01C 21/3807* (2020.08); *G05D 1/101* (2013.01); *G06F 3/16* (2013.01); *G06N 20/00* (2019.01); *G08G 5/0013* (2013.01)

(58) Field of Classification Search
CPC .................................................. G08F 5/0039
See application file for complete search history.

(56) References Cited

U.S. PATENT DOCUMENTS

| | | | | |
|---|---|---|---|---|
| 8,311,686 | B2 * | 11/2012 | Herkes | G08G 5/0017 |
| | | | | 701/14 |
| 9,310,204 | B2 * | 4/2016 | McGregor | G08G 5/0034 |
| 11,244,572 | B2 * | 2/2022 | Villa | G01C 23/00 |
| 11,741,755 | B2 * | 8/2023 | Ko | G06F 3/017 |
| | | | | 382/100 |
| 11,804,207 | B1 * | 10/2023 | Salter | G10L 25/51 |
| 11,900,818 | B2 * | 2/2024 | Rostamzadeh | G08G 5/0095 |
| 2011/0046818 | A1 | 2/2011 | Herkes et al. | |
| 2020/0388166 | A1 | 12/2020 | Rostamzadeh et al. | |
| 2021/0034846 | A1 | 2/2021 | Ko et al. | |

(Continued)

OTHER PUBLICATIONS

Lee et al., Aviation Environmental Design Tool (AEDT): Technical Manual, Version 3b, Volpe National Transportation System Center, Sep. 6, 2019, 468 pages.

(Continued)

*Primary Examiner* — Michael A Berns
(74) *Attorney, Agent, or Firm* — Yee & Associates, P.C.

(57) ABSTRACT

A method, apparatus, system, and computer program product for predicting a maximum sound pressure level generated by an aircraft. A flight path over a location is identified. The maximum sound pressure level generated by an aircraft for the identified flight path over the location is predicted using a machine learning model trained using a training dataset comprising historical aircraft sensor data for selected parameters, historical atmospheric data, and historical sound data recorded by a microphone system for flight paths over the location.

34 Claims, 15 Drawing Sheets

(56) References Cited

U.S. PATENT DOCUMENTS

| | | | |
|---|---|---|---|
| 2022/0114506 A1 | 4/2022 | Villa et al. | |
| 2023/0351996 A1 | 11/2023 | Salter et al. | |
| 2023/0394977 A1* | 12/2023 | Ayhan | G08G 5/003 |
| 2023/0394978 A1* | 12/2023 | Ayhan | G08G 5/0039 |
| 2023/0396919 A1* | 12/2023 | Ayhan | G06N 3/045 |

OTHER PUBLICATIONS

Lopes et al., "Design of the Next Generation Aircraft Noise Prediction Program: ANOPP2," 17th AIAA/CEAS Aeroacoustics Conference (32nd AIAA Aeroacoustics Conference), Jun. 2011, 17 pages.

Ayhan et al., "Machine Learning System for Sound Exposure Level Prediction," U.S. Appl. No. 17/805,389, filed Jun. 3, 2022, 87 pages.

Ayhan et al., "Deep Learning System for Real Time Maximum Sound Pressure Level Prediction," U.S. Appl. No. 17/805,403, filed Jun. 3, 2022, 107 pages.

George Ho, Autoregressive Models in Deep Learning—A Brief Survey (https://www.georgeho.org/deep-autoregressive-models/) (last accessed May 1, 2024) (Mar. 9, 2019).

Office Action dated May 8, 2024, regarding U.S. Appl. No. 17/805,403, 36 pages.

Thomas Wood, What is Backpropagation? (https://web.archive.org/web/20210901211049/ https://deepai.org/ machine-learning-glossary-and-terms/backpropagation) (last accessed May 3, 2024) (Sep. 12, 2021).

US Dep't of Transp. FAA, Aviation Environmental Design Tool, Technical Manual, Version 2a (Jan. 2014).

Notice of Allowance, dated Sep. 12, 2024, regarding U.S. Appl. No. 17/805,403, 17 pages.

* cited by examiner

MACHINE LEARNING SYSTEM FOR MAXIMUM SOUND PRESSURE LEVEL PREDICTION

CROSS-REFERENCE TO RELATED APPLICATIONS

This application is related to the following patent applications entitled "MACHINE LEARNING SYSTEM FOR SOUND EXPOSURE LEVEL PREDICTION", filed Jun. 3, 2022 and assigned USPTO application Ser. No. 17/805,389 in US Patent Publication No. US 2023-0394977-A1 dated Dec. 7, 2023; and "DEEP LEARNING SYSTEM FOR REAL TIME MAXIMUM SOUND PRESSURE LEVEL PREDICTION", filed Jun. 3, 2022 and assigned USPTO application Ser. No. 17/805,403 in US Patent Publication No. US 2023-0396919-A1 dated Dec. 7, 2023 to the same assignee. The aforementioned applications are incorporated herein by reference in their entirety.

BACKGROUND INFORMATION

1. Field

The present disclosure relates generally to managing aircraft noise and in particular, to a method and system to predict maximum sound pressure levels for aircraft arrivals and departures.

2. Background

Aircraft arriving at airports and aircraft departing from airports produce noise levels that can disturb communities surrounding the airport. Significant decreases have been made in the noise caused by aircraft in the past few decades. However, improvements and navigation techniques have resulted in aircraft overflowing some communities with increased frequency. This change has resulted in complaints from communities at locations on departure and arrival flight tracks.

In response to these complaints, many countries have enacted regulations to control aircraft noise. For example, the Federal Aviation Administration (FAA) regulates the maximum amount of noise that an individual civil aircraft can produce during takeoff and landing and near airports. Air navigation service providers (ANSPs) across the world are making efforts to enforce noise-reduced arrival and departure procedures and penalizing airlines for their flights that produce noise above mandated thresholds.

The measurement of noise can be made in a number of different ways. Maximum sound pressure level (LAnax) is a measurement of a maximum sound pressure level reached during the measurement time period that is expressed in dB(A). In these examples, maximum sound pressure level (LAmax) is the highest time weighted sound pressure level.

This type of noise can be measured by microphones located at the airport for arrivals and departures. With the maximum sound pressure level, during the time of an aircraft overflight, the measurement of noise can start at background levels and rise to the maximum level as aircraft flies closer to the microphone on the ground and returns to background level as the aircraft moves into the distance.

Regulations can specify noise reduced arrival and departure procedures along with thresholds for the maximum sound pressure level. Airlines can be penalized for the arrival and departure of flights at airports that produce noise above the specified thresholds for the maximum sound pressure level.

SUMMARY

An embodiment of the present disclosure provides a method that predicts a maximum sound pressure level generated by an aircraft. A set of machine learning models are trained to predict the maximum sound pressure level generated by the aircraft for a flight path over a location using a training dataset comprising historical aircraft sensor data for selected parameters, historical atmospheric data, and historical sound data recorded by a microphone system for flight paths over the location. The maximum sound pressure level generated by the aircraft for the flight path over the location is predicted using the set of machine learning models after training the set of machine learning models using the training dataset.

In another embodiment of the present disclosure, a method predicts a maximum sound pressure level generated by an aircraft. A flight path over a location is identified. The maximum sound pressure level generated by the aircraft for the identified flight path over the location is predicted using a machine learning model trained using a training dataset comprising historical aircraft sensor data for selected parameters, historical atmospheric data, and historical sound data recorded by a microphone system for flight paths over the location.

In yet another embodiment of the present disclosure, a maximum sound pressure level prediction system comprises a computer system and a maximum sound pressure level predictor in the computer system. The maximum sound pressure level predictor trains a set of machine learning models to predict a maximum sound pressure level generated by an aircraft for a flight path over a location using a training dataset comprising historical aircraft sensor data for selected parameters, historical atmospheric data, and historical sound data recorded by a microphone system for flight paths over the location. The maximum sound pressure level predictor predicts the maximum sound pressure level generated by the aircraft for the flight path over the location using the set of machine learning models after training the set of machine learning models using the training dataset.

In still another embodiment of the present disclosure, a computer program product predicts a maximum sound pressure level generated by an aircraft. The computer program product comprises a computer readable storage medium having program instructions embodied therewith. The program instructions are executable by a computer system to cause the computer system to perform a method that identifies a flight path over a location; and predicts the maximum sound pressure level generated by the aircraft for the flight path over the location using a machine learning model trained using a training dataset comprising historical aircraft sensor data for selected parameters, historical atmospheric data, and historical sound data recorded by a microphone system for flight paths over the location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
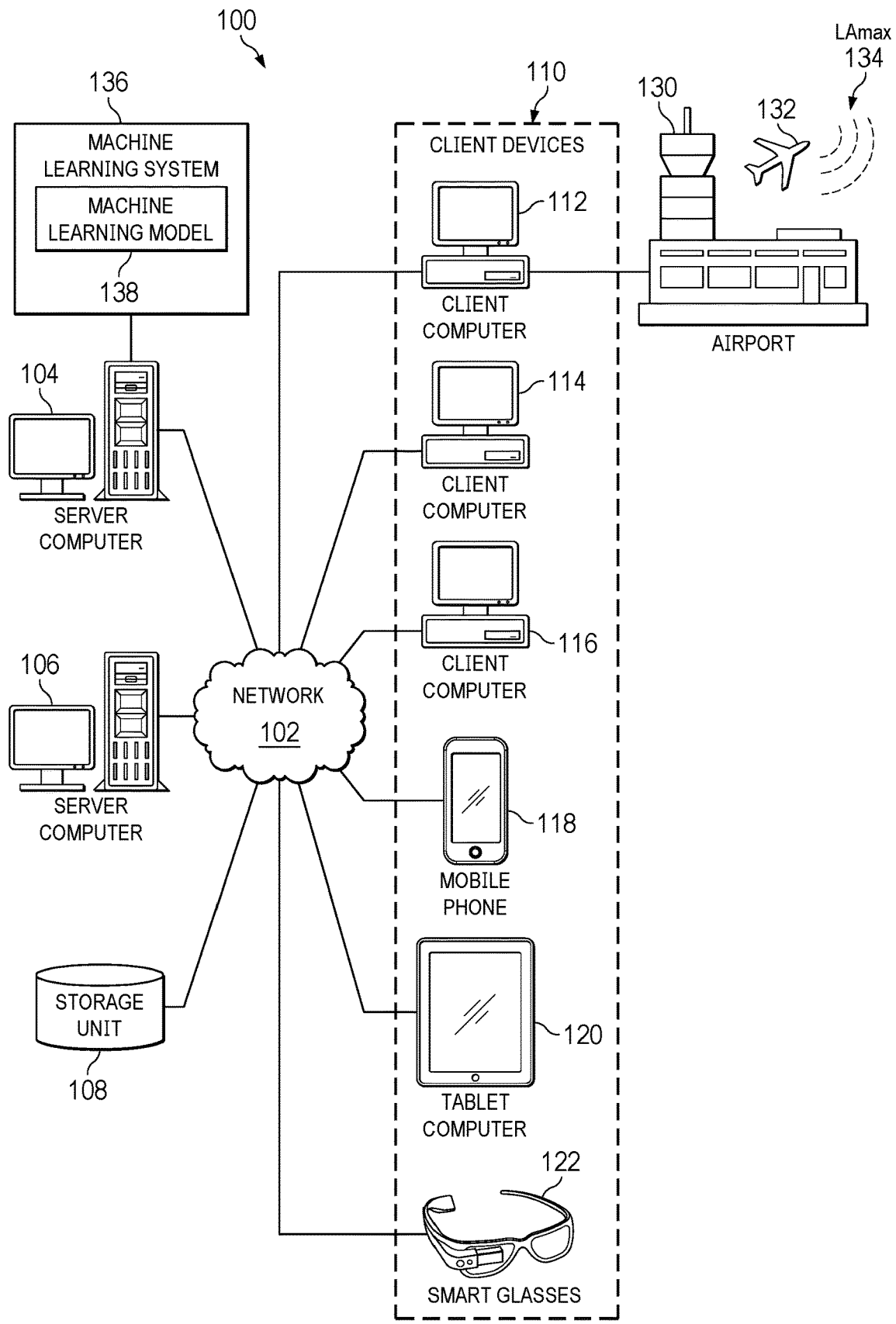
FIG. 1 is a pictorial representation of a network of data processing systems in which illustrative embodiments can be implemented.

The illustrative embodiments recognize and take into account one or more different considerations as described herein. For airlines to comply with these requirements, airlines need to be able to accurately predict noise for their arriving and departing flights. Additionally, air navigation service providers need be able to accurately predict noise for flights so that the air navigation service providers can generate noise-reduced arrival and departure procedures and enforce noise mitigated arrivals and departures.

Being able to accurately predict the maximum sound pressure level for an arriving or departing flight in the vicinity of airport can be used to improve the impact of aircraft noise on the environment for locations around the airport. Further, with ability to predict LAmax for arriving and departing flights, airlines can plan and use flight paths that have maximum sound pressure levels that are lower to avoid penalties imposed by air navigation service providers. Further, with the ability to accurately predict maximum sound pressure levels, air navigation service providers can generate noise reduced arrival and departure procedures.

Currently, various approaches are present for predicting noise for flights. One approach is the FAA Aviation Environmental Design Tool (AEDT). This tool uses the noise-power distance (NPD) curves that provide noise levels measured at various distances from a particular aircraft and engine configuration for different thrust settings and operational modes.

Although this approach is relatively numerically efficient and consistent with noise certification values, this approach cannot capture noise propagation effects for different weather conditions and aircraft configurations. As a result, the accuracy of AEDT is not as great as desired.

Another approach is a semi-empirical, physics-based approximation model employed by the Aircraft Noise Prediction Program (ANOPP). This model computes noise levels from the airframe and engine components at a user-defined three-dimensional observer grid for an arbitrary flight procedure. This model can be continuously updated with historical noise data and applies parametric and component models to separately simulate each relevant noise source.

Although this approach is relatively accurate, it is time consuming and computer-intensive. This approach also suffers from lack of robust validation and verification for each relevant noise source. ANOPP is a semi-empirical and physics-based system in which human operators formulate the solution using only several parameters for a limited number of cases.

Thus, illustrative examples employ machine learning models that are unbiased and can utilize large amounts of data. These machines learning models can also consider all regular and irregular edge cases formulating a solution with as many parameters that are available. The illustrative examples provide a more accurate and efficient manner to predict maximum sound pressure levels through the use of machine learning models as compared to current techniques for predicting maximum sound pressure levels.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

This illustrative example, client computer 112 is a client device in client devices 110 located at or in communication with airport 130. As depicted, commercial airplane 132 can arrive and takeoff from airport 130. Commercial airplane 132 generates noise that can be measured using the parameter LAmax 134. In the illustrative example, LAmax 134 is a maximum sound pressure level that commercial airplane 132 generates during flight over airport 130. This flight can be for an arriving flight or a departing flight from airport 130 in this illustrative example.

In this illustrative example, machine learning system 136 comprises machine learning model 138 that operates to predict LAmax 134 as commercial airplane 132 flies over airport 130 when arriving or taking off.

In this illustrative example, machine learning model 138 has been trained to predict noise in the form of LAmax 134 using training dataset that includes historical aircraft sensor data, historical atmospheric data, and historical sound data.

Figure 2:
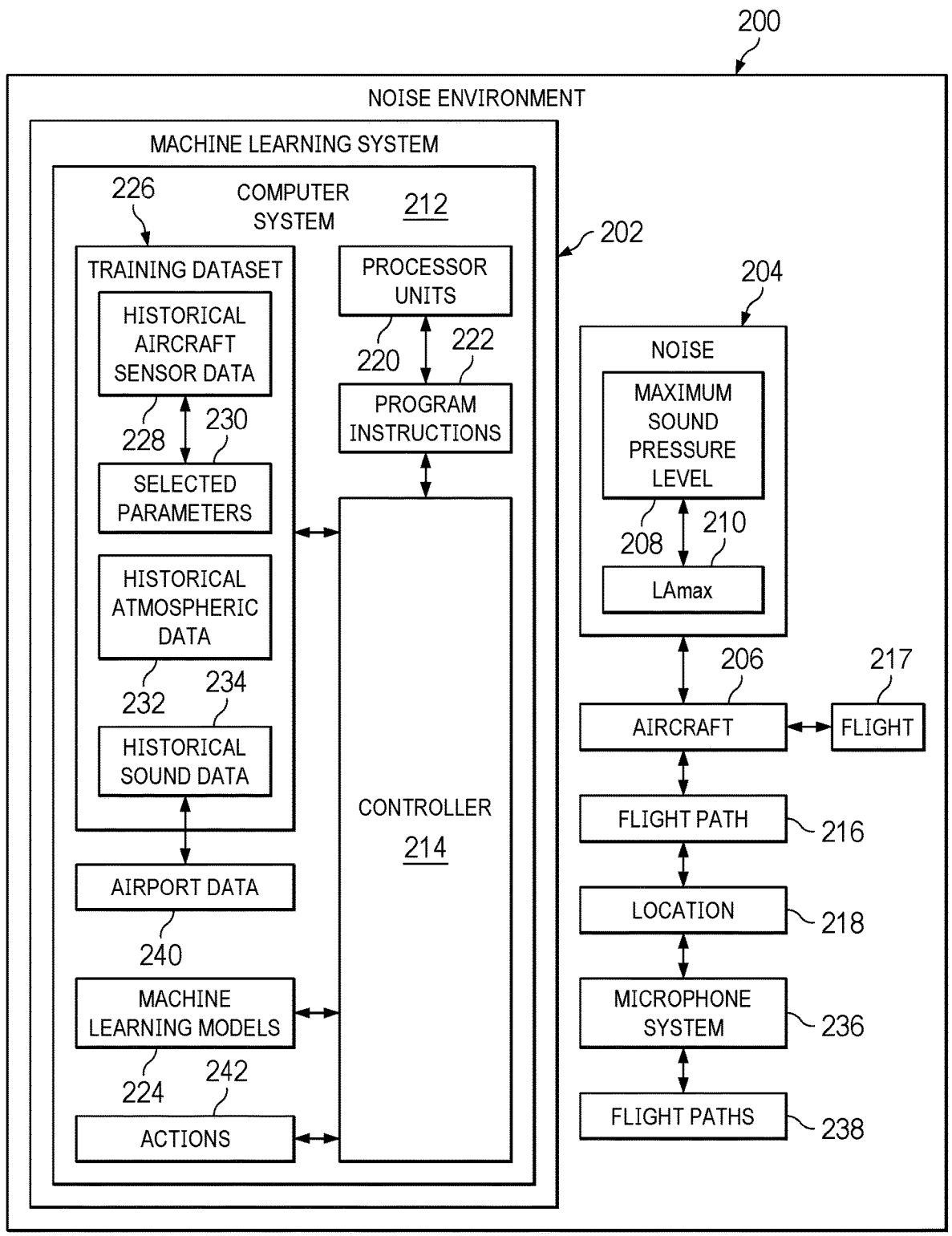
FIG. 2 is a block diagram of a noise environment in accordance with an illustrative embodiment.

With reference now to FIG. 2, a block diagram of a noise environment is depicted in accordance with an illustrative embodiment. In this illustrative example, noise environment 200 includes components that can be implemented in hardware such as the hardware shown in network data processing system 100 in FIG. 1.

In this illustrative example, machine learning system 202 in noise environment 200 can operate to predict noise 204 for aircraft 206. In this illustrative example, the prediction of noise 204 is a prediction of maximum sound pressure level 208 generated by aircraft 206. In this example, maximum sound pressure level 208 can be referred to as LAmax 210. Maximum sound pressure level 208 can be a maximum A-weighted sound pressure level in which the A weighting adjusts sound pressure reading levels to reflect the sensitivity of the human ear.

Aircraft 206 can take a number of different forms. For example, aircraft 206 can be a commercial airplane, a tilt-rotor aircraft, a tilt wing aircraft, a vertical takeoff and landing aircraft, an electrical vertical takeoff and landing vehicle, a personal air vehicle, and other types of aircraft 206.

In this illustrative example, machine learning system 136 comprises computer system 212 and controller 214. Controller 214 is located in computer system 212. In this illustrative example, controller 214 can operate to predict maximum sound pressure level 208 generated by generated by aircraft 206 for flight path 216 over location 218. In this illustrative example, flight path 216 can be for an arrival or departure of aircraft 206. Location 218 is an airport in this example but can be any area where a prediction of maximum sound pressure level 208 is of interest. As another example, location 218 can be an area adjacent to or near an airport.

Controller 214 can be implemented in software, hardware, firmware, or a combination thereof. When software is used, the operations performed by controller 214 can be implemented in program code configured to run on hardware, such as a processor unit. When firmware is used, the operations performed by controller 214 can be implemented in program code and data and stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 220 that are capable of executing program instructions 222 implementing processes in the illustrative examples. As used herein a processor unit in the number of processor units 220 is a hardware device and is comprised of hardware circuits such as those on an integrated circuit that respond and process instructions and program code that operate a computer. When a number of processor units 220 execute program instructions 222 for a process, the number of processor units 220 is one or more processor units that can be on the same computer or on different computers. In other words, the process can be distributed between processor units on the same or different computers in a computer system. Further, the number of processor units 220 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 trains a set of machine learning models 224 to predict maximum sound pressure level 208 generated by aircraft 206 for flight path 216 during flight 217 of aircraft 206 over location 218 using a training dataset 226. In this example, flight path 216 can be a future or planned flight path when flight 217 of aircraft 206 has not yet occurred.

In this illustrative example, training dataset 226 comprises historical aircraft sensor data 228 for selected parameters 230, historical atmospheric data 232, and historical sound data 234 recorded by a microphone system 236 for flight paths 238 over location 218. Historical aircraft sensor data 228 for selected parameters 230, historical atmospheric data 232, and historical sound data 234 recorded by a microphone system 236 for flight paths 238 can be for at least one of an aircraft type, a tail number, or an airline. In other words, training dataset 226 can have levels of granularity with respect to predictions of maximum sound pressure level 208.

Historical aircraft sensor data 228 is sensor generated data from various aircraft flying flight paths 238 over location 218. The various aircraft that generate historical aircraft sensor data 228 can include aircraft 206 or other aircraft.

Historical atmospheric data 232 can include temperature, humidity, pressure, wind, and other weather conditions. Historical atmospheric data 232 can include information for different altitudes.

In this illustrative example, historical sound data 234 comprises sound data recorded for flight paths 238. Historical sound data 234 can also include metadata about the sound recorded. For example, the metadata can include slant distances, microphone configuration, microphone locations, and other suitable information. Microphone system 236 comprises microphones at different positions in or near location 218. These microphones can record sound in location 218. For example, microphones can be located along a runway, a flight path, or other positions and location 218.

In this illustrative example, all of the historical data in training dataset 226 is correlated to times for when flight paths 238 are already flown flight paths for one or more aircraft. Historical sound data 234 can be part of airport data 240. Further, airport data 240 can include other information for training dataset 226. For example, airport data 240 can include information about aircraft altitude, location, and other information that can be used to determine flight paths 238. As a result, flight paths 238 can be obtained from airport data 240 in addition to or in place of using historical aircraft sensor data 228.

Controller 214 can predict maximum sound pressure level 208 generated by aircraft 206 for flight 217 of aircraft 206 using flight path 216 over location 218 using the set of machine learning models 224 after training the set of machine learning models using training dataset 226. Based on predicting maximum sound pressure level 208, controller 214 can perform a set of actions 242.

The set of actions 242 can include at least one of planning flight path 216 over location 218 using the prediction of the maximum sound pressure level 208 generated by aircraft 206 for flight path 216 over location 218, determining compliance with a regulation regarding maximum sound pressure level 208 for the location, changing flight path 216, logging maximum sound pressure level 208, change a flight time for using flight path 216, identifying changes to aircraft configuration for aircraft 206, automatically changing the flight path 216, or other suitable actions. These actions can be used to reduce noise 204 generated by aircraft 206 prior to aircraft 206 flying over location 218 using flight path 216. For example, changing the flight time for using flight path 216 to a time when atmospheric conditions are different such that the flight using flight path 216 at the change flight time will provide a desired level maximum sound pressure level 208.

Figure 3:
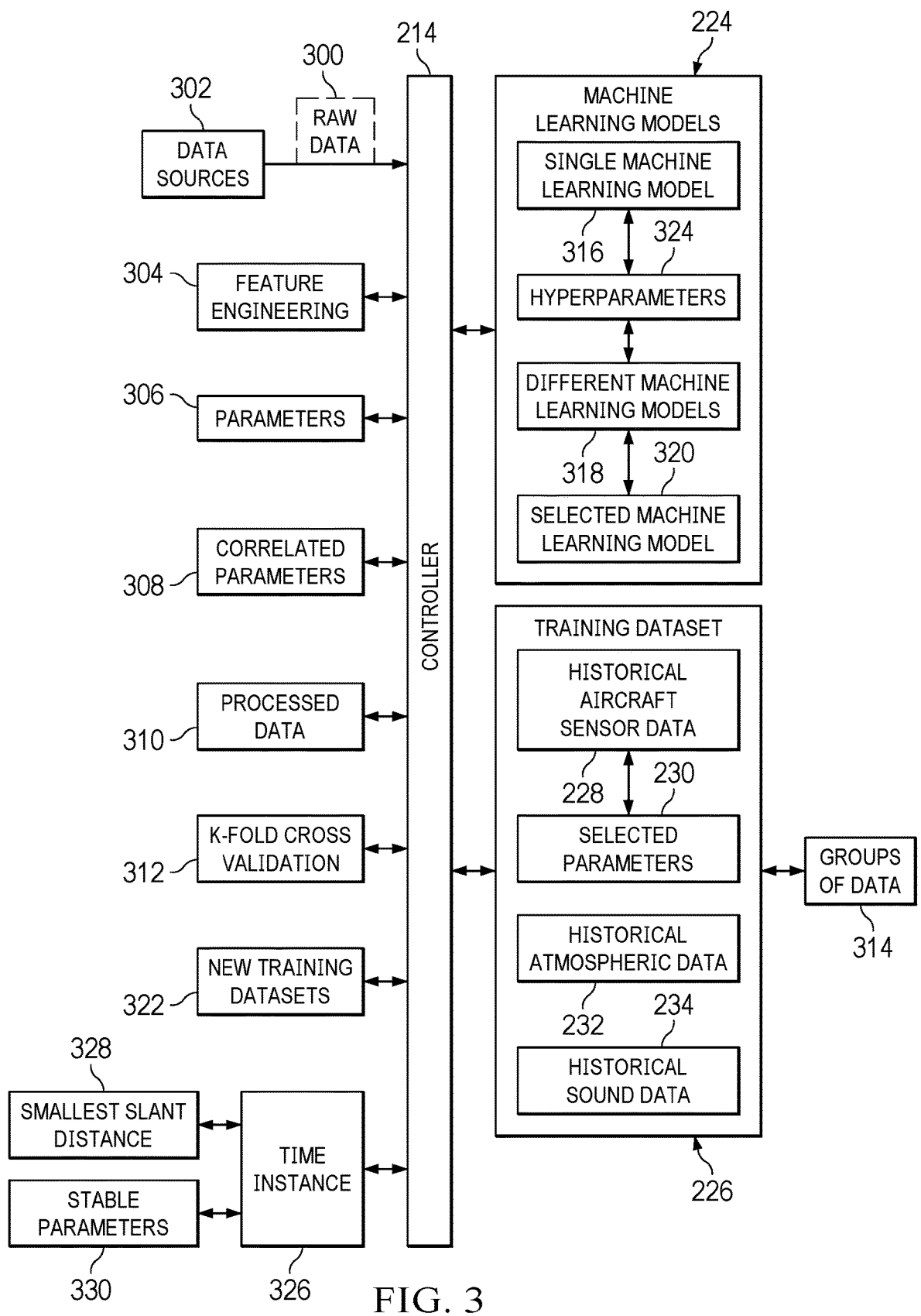
FIG. 3 is an illustration of a block diagram for training machine learning models in accordance with an illustrative embodiment.

Turning next to FIG. 3, an illustration of a block diagram for training machine learning models is depicted in accordance with an illustrative embodiment. In this illustrative example, controller 214 receives raw data 300 from data sources 302 for processing to create training dataset 226.

Raw data 300 can be large and volume, noisy, and incomplete. This raw data is historical data that can include continuous parameter logging (CPL) data, ERA5 weather data, airport data, and other suitable types of data. In this example, continuous parameter logging data is an example of historical aircraft sensor data 228 in FIG. 2.

In this example, ERA5 weather data is an example of historical atmospheric data 232. ERA5 weather data can include temperature, wind, humidity with timestamps. ERA5 is available from European Centre for Medium-Range Weather Forecasts (ECMWF), which is an independent intergovernmental organization.

Airport data in raw data 300 is an example of data that can include historical sound data 234. This historical sound data 234 is ground truth and can include maximum sound pressure level 208 for microphone locations, slant distances, and aircraft altitudes. Maximum sound pressure level 208 can be referred to as LAmax 210.

In processing raw data 300, controller 214 can perform feature engineering 304. In this illustrative example, feature engineering 304 can include at least one of selecting relevant features, handling missing data, computing additional parameters, normalizing data, standardizing data, performing dimensionality reduction, or other suitable processing of the raw data. For example, controller 214 can compute additional parameters, such as thrust for left and right engines, atmospheric absorption at 251 Hz, 398 Hz, and 631 Hz frequencies, day of week, and week of month, and impute values for missing parameters such as aircraft weight, fuel flow for left and right engines, runway code, and registration.

These different operations can be performed in feature engineering 304 to select salient features for use as selected parameters 230 for which data is included in training dataset 226. In performing feature engineering, controller 214 can select parameters from parameters 306 identified in raw data 300. The selection of these parameters are correlated parameters 308 that have a correlation to maximum sound pressure level 208 to form correlated parameters 308.

Further, parameters 306 can be removed from correlated parameters 308 that are repetitive to form selected parameters 230. Repetitive parameters can be filtered out using techniques such as correlation selection and mutual information. A final selection of salient features to form selected parameters 230 can be made using a dimensionality reduction algorithm such as Principal Component Analysis (PCA).

In this illustrative example, raw data 300 processed using feature engineering 304 forms processed data 310. Processed data 310 can be stored in a data structure such as one or more tables.

With timeseries data in processed data 310, each time step is a row and each sensor reading for a parameter is a column in the table. For example, each row can be for a particular time step in which the columns are values for selected parameters 230.

Each table can be for a particular flight using the flight path for a particular microphone. For example, a table can be for departure or arrival using a flight path. In the illustrative example, a time step that best represents maximum sound pressure level 208 can be selected for a particular microphone.

In generating processed data 310, controller 214 can select time instance 326 where smallest slant distance 328 is present between an aircraft and a microphone in which all of selected parameters 230 for time instance are stable parameters 330. In this example, selected parameters 230 are stable parameters 330 when a moving average of each selected parameter in selected parameters 230 are within a threshold.

In illustrative example, selected parameters 230 are examined to identify stable parameters 330 and not all of the parameters from which selected parameters 230 were identified. Selected parameters 230 are correlated such that these parameters change over time as maximum sound pressure level 208 changes. Other parameters not identified as selected parameters 230 are excluded. These other parameters do not change or change regardless of changes to maximum sound pressure level 208. For example, parameters such as date, time, or other similar parameters are not selected parameters 230 and are not considered.

When smallest slant distance 328 is found for a microphone, the selected parameters 230 for that time instance is added to training dataset 226.

This selection can be repeated for each microphone in microphone system 236 for which historical sound data 234 is present. The selection can be performed using heuristics searching for the best matching instance where the slant distance microphone to the aircraft is below the threshold and selected parameters 230 remain stable. In this illustrative example, the maximum sound pressure level measured at the selected time instance is a label for selected parameters 230 for that time instance.

In this example, processed data 310 can be split or divided for use in evaluating quality of the set of machine learning models 224. For example, k-fold cross validation 312 can be performed to divide up processed data for use. With k-fold cross validation 312 processed data 310 is split into k parts. k−1 part of the data is used for training and the remaining 1 part is used for validation and testing in a rotating manner.

In this illustrative example, training dataset 226 can be comprised of groups of data 314. Each group of data in the groups of data 314 is for a flight using a flight path in the flights using flight paths 238 and includes historical aircraft sensor data for selected parameters 230, historical atmospheric data 232, and historical sound data 234 recorded by a microphone system corresponding to time instances for the maximum sound pressure levels for the flight.

The set of machine learning models 224 can be single machine learning model 316. In another example, the set of machine learning models 224 can be different machine learning models 318. When different machine learning models 318 are present, these machine learning models can be selected from at least one of one of a linear machine learning model, a nonlinear machine learning model, an ensemble machine learning model system, a neural network model, or other suitable type of machine learning model.

In this illustrative example, the training is performed for each machine learning model in different machine learning models 318. Each machine learning model is trained using the same training dataset, training dataset 226. With this type of training, different machine learning models 318 can compete with each other to find the best machine learning model.

Further, before, during or after training, hyperparameters 324 can be adjusted for different machine learning models 318 to increase accuracy prior to selecting the machine learning model from the different machine learning models 318 having the highest level of accuracy. Hyperparameters 324 are parameters whose values are used to control the learning process in machine learning. Hyperparameters 324 can also be adjusted in single machine learning model 316 to increase the performance of this machine learning model.

In other words, controller 214 can identify a machine learning model from different machine learning models 318 having a highest level of accuracy in predicting the maximum sound pressure levels. A machine learning model having the highest level of accuracy is selected machine learning model 320 and used to predict maximum sound pressure level 208 for flight path 216 of aircraft 206 over location 218.

The selection of selected machine learning model 320 can be made in any number of different ways. For example, the resulting mean error and standard deviation can be determined for each of different machine learning models 318 to select the top ranking model as selected machine learning model 320.

In the illustrative example, this training can be repeated periodically. In some cases, the training can be performed continuously as new raw data is received from data sources 302. For example, new training datasets 322 can be generated from new aircraft sensor data for selected parameters 230, new atmospheric data, and new sound data recorded by the microphone system 236 in raw data 300.

With new training datasets 322, training of different machine learning models 318 can be repeated. Further, identifying the machine learning model having the highest level of accuracy in predicting the maximum sound pressure levels can be performed in response to continuing to train different machine learning models 318. As a result, selected machine learning model 320 can change over time as different machine learning models 318 are continued to be trained using new training datasets 322.

Figure 4:
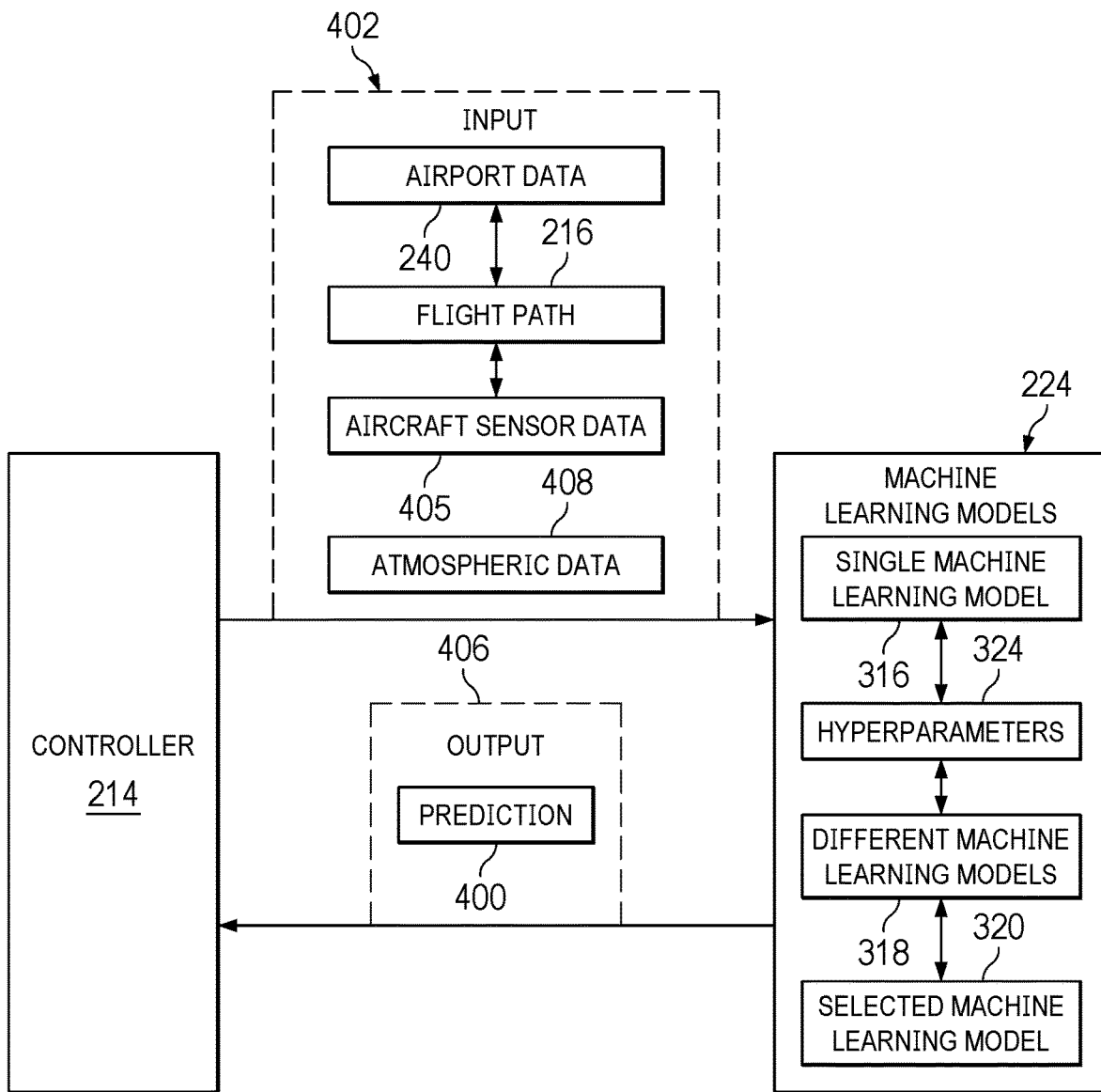
FIG. 4 is an illustration of a block diagram for predicting a maximum sound pressure level for a flight path of an aircraft in accordance with an illustrative embodiment.

With reference next to FIG. 4, an illustration of a block diagram for predicting a maximum sound pressure level for a flight path of an aircraft is depicted in accordance with an illustrative embodiment. In this illustrative example, controller 214 can use the set of machine learning models to generate prediction 400 of maximum sound pressure level 208 for flight path 216 of aircraft 206 over location 218.

In this illustrative example, controller 214 sends input 402 into the set of machine learning models 224 and in particular to selected machine learning model 320. In response, the set of machine learning models 224 generates output 406 containing prediction 400.

Input 402 is expected to be the same type of data in training dataset 226 without labels such as maximum sound pressure levels. In this illustrative example, input 402 comprises aircraft sensor data 405 for selected parameters 230, atmospheric data 408, and flight path 216. Flight path 216 is expected path that aircraft 206 will use. Flight path 216 can be derived from airport data 240 or can be input as expected waypoints in aircraft sensor data 405.

In other words, some forecasting or assumptions can be made for data in input 402 to predict maximum sound pressure level 208 for flight 217 of aircraft 206 using flight path 216 prior to aircraft 206 flying over location 218 using flight path 216. In this illustrative example, atmospheric data 408 can be obtained from weather forecasts. Aircraft sensor data 405 can be obtained from an analysis of prior flights using flight path 216 for aircraft 206 or other aircraft of the same or similar type. Data from prior flights for flight path 216 can be used when that data is not expected to change or change in a manner that reduces prediction 400 to an undesired level of accuracy.

For example, some of selected parameters 230 are stable and may not change from flight to flight for flight path 216. For example, fuel consumption may be stable and aircraft weight and fuel weight may not change sufficiently to reduce the accuracy in predicting maximum sound pressure level 208 with a desired level of accuracy.

Thus, although some deviations may be present in actual flight as compared input 402, the deviations can be small enough that prediction of maximum sound pressure 208 has a desired level of accuracy. This accuracy even with some deviations from data that is generated during actual flight is greater than current techniques for predicting maximum sound exposure levels.

In some illustrative examples, the prediction can be performed in real time. In this illustrative example, real time means the actual time during which an event occurs. For example, performing the prediction in real time can mean that inputs to the machine learning models are made quickly enough during the flight of aircraft on a flight path such that a prediction of maximum sound pressure level can be received immediately as feedback. In other words, the prediction can be received quickly enough such that actions can be taken or adjustments can be made to the flight of the aircraft using a particular flight path.

In other words, at least one of aircraft sensor data 405 or atmospheric data 408 can be obtained for input 402 in real time. In this manner, predictions can be made for maximum sound pressure level 208 for each microphone in microphone system 236. From these predictions of maximum sound pressure level 208 for all of flight path 216 can be determined by predicting the highest value for maximum sound pressure level 208 for each microphone.

In one illustrative example, one or more technical solutions are present that overcome a problem with predicting maximum sound pressure levels for aircraft flying over location such as an airport with the desired level of accuracy. As a result, one or more solutions can provide a solution that employs machine learning models to predict aircraft noise more accurately as compared to current techniques. For example, machine learning system 202 can provide maximum sound pressure level 208 with a mean error of less than 2 dB(A) with a 0.2 dB(A) of standard deviation for both arrival and departures flights. This level of accuracy shows a higher level of improvement as compared to current aircraft noise prediction program (ANOPP2), which is an improved version of ANOPP that has a mean error of less than 4 dB(A) for departures for computing a maximum sound pressure level but has issues in computing this value for arrivals. The units dB(A) means the decibels measured are an expression of loudness of sounds in air as perceived by the human ear.

Computer system 212 can be configured to perform at least one of the steps, operations, or actions described in the different illustrative examples using software, hardware, firmware, or a combination thereof. As a result, computer system 212 operates as a special purpose computer system in which controller 214 in computer system 212 enables predictions of maximum sound pressure levels for flights of aircraft using different flight paths. In particular, controller 214 transforms computer system 212 into a special purpose computer system as compared to currently available general computer systems that do not have controller 214.

The illustration of noise environment 200 and the different components in figures in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 214 trains additional machine learning models to provide predictions of maximum sound pressure level 208 for other aircraft in addition to or in place of aircraft 206. Further, computer system 212 can include components in aircraft 206 such that controller 214 can operate within aircraft 206 to predict maximum sound pressure level 208 in real time. With this location of components in aircraft 206, controller 214 can more easily obtain sensor data from aircraft 206 in real time and make a real time prediction of maximum sound pressure level 208 for aircraft 206.

Further, controller 214 may be located on a single computer or distributed in multiple computers in in computer system 212. Additionally, the functionality of controller 214 can be implemented as a service in a cloud computing environment. This service can be offered as a subscription a per use basis for aviation authorities, regulatory agencies, air navigation service providers, airlines, and other entities. Additionally, the predictions generated can also be used to develop aircraft designs that produce less noise. Further, these predictions can also be used to reconfigure, upgrade, or retrofit current aircraft to reduce noise produced by the aircraft.

Figure 5:
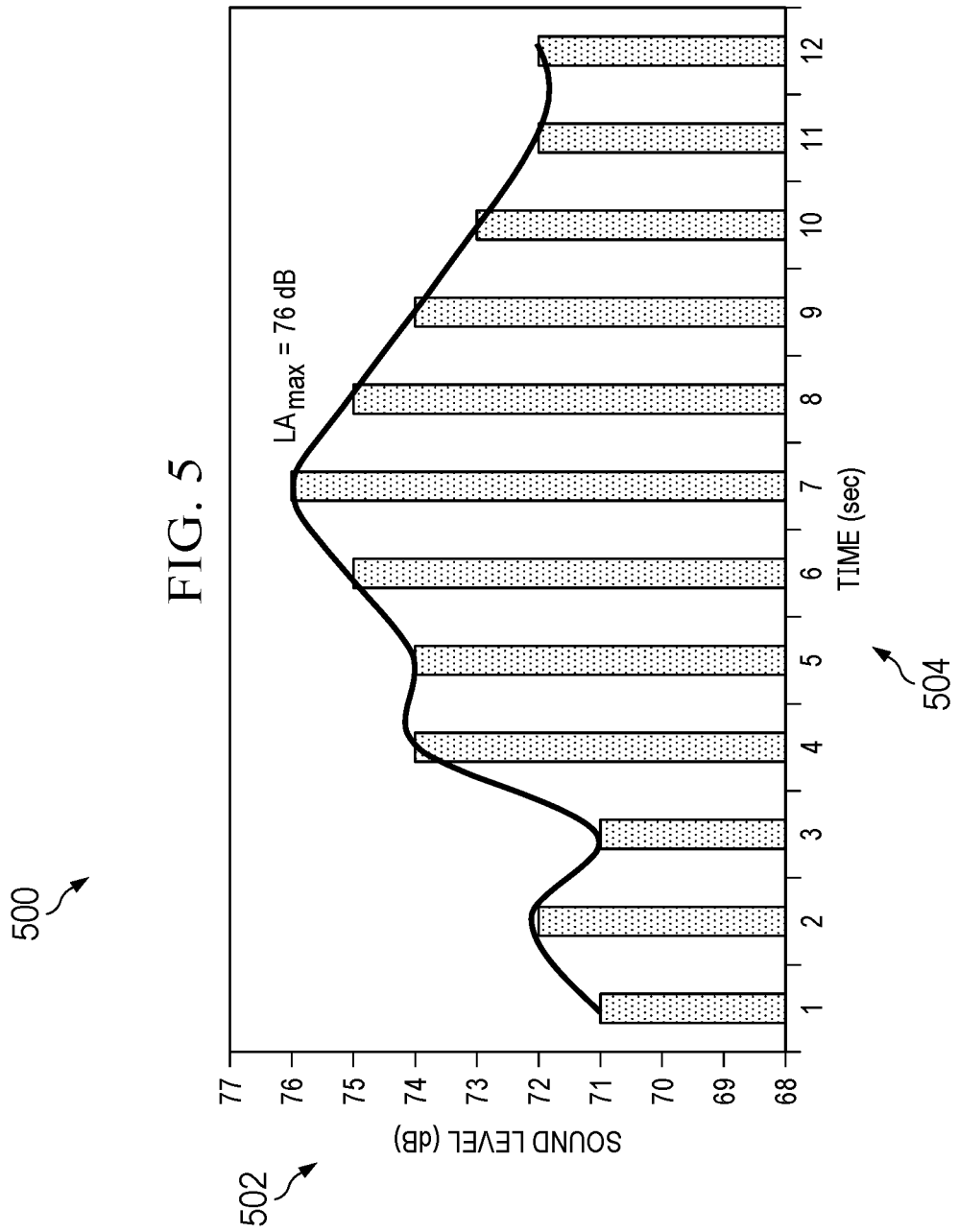
FIG. 5 is an illustration of a graph of a noise event in accordance with an illustrative embodiment.

Turning now to FIG. 5, an illustration of a graph of a noise event is depicted in accordance with an illustrative embodiment. In this illustrative example, graph 500 is a graph of a noise event recorded by a microphone and a microphone system at an airport. As depicted, y-axis 502 is the sound level in dB and x-axis 504 is time in seconds.

As depicted, the noise level starts at ambient or background noise level at time equal to one second and level rises to a maximum level, representing the maximum sound pressure level (LAnax) as aircraft flies closer to the microphone. In this example, the maximum sound pressure level is of 76 dB at seven seconds. The noise level decreases as the aircraft proceeds into the distance. In this example, the noise event duration is 12 seconds.

Figure 6:
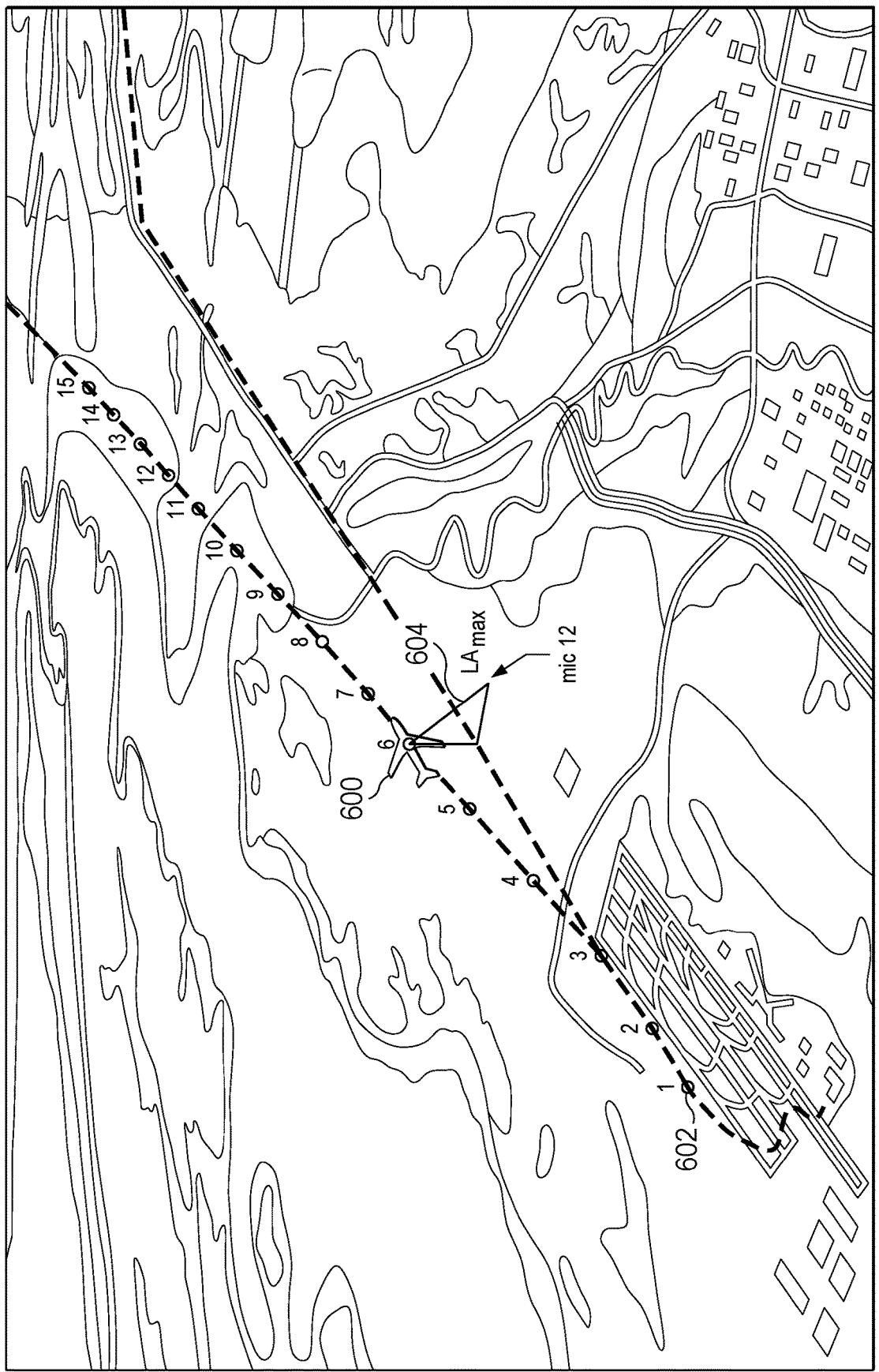
FIG. 6 is an illustration of a flight path for departures of an aircraft in accordance with an illustrative embodiment.

Turning next to FIG. 6, an illustration of a flight path for departures of an aircraft is depicted in accordance with an illustrative embodiment. In this illustrative example, aircraft 600 flies on a flight path identified by waypoints 602. In this depicted example, waypoints 602 comprises waypoints 1-15.

As depicted, aircraft 600 is located at waypoint 6 in waypoints 602. In this example, microphone 12 has minimum slant distance 604 to aircraft 600. In this example, waypoint 6 can be the time at which microphone 12 records the maximum sound pressure level for aircraft 600. In this example, sensor data from sensor readings for aircraft 600 at this way point can be correlated with other parameters to create training data in which the maximum sound pressure level is correlated with selected features. In other words, the maximum sound pressure level can be used as a label for sensor data, atmospheric data, and airport data for the time instance at which microphone 12 records sound for aircraft 600 at waypoint 6.

Figure 7:
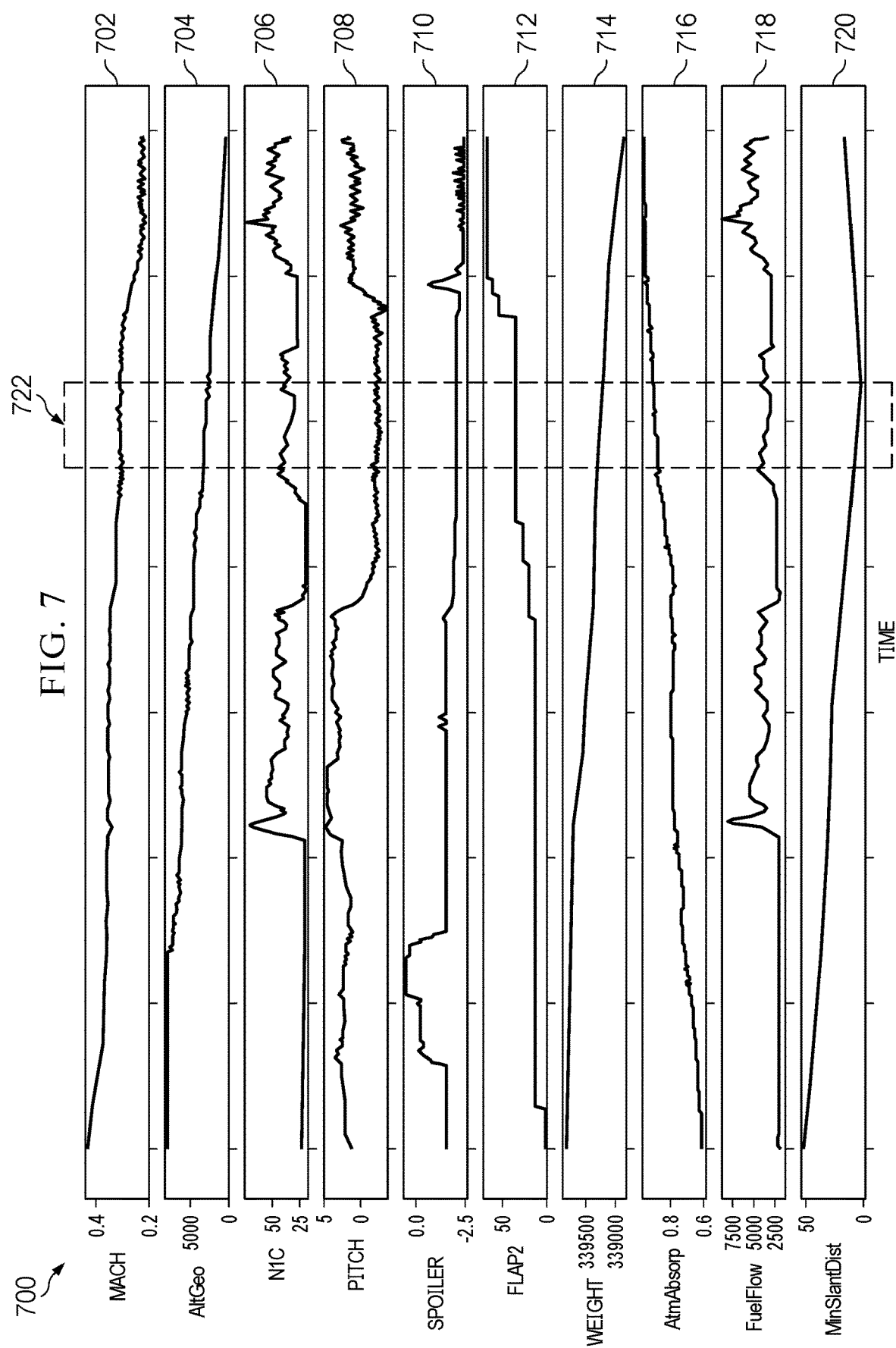
FIG. 7 is an illustration of graphs of sensor data for selected parameters in accordance with an illustrative embodiment.

With reference now to FIG. 7, an illustration of graphs of sensor data for selected parameters are depicted in accordance with an illustrative embodiment. In this illustrative example, graphs 700 are graphs for parameters such as Mach 702, altitude (AltGeo) 704, N1C 706, pitch 708, spoiler 710, flap2 712, weight 714, atmospheric absorption (AtmAbsorp) 716, fuel flow (FuelFlow) 718, and minimum slant distance (MinSlantDist) 720. The y-axes for these graphs indicate values for the associated parameters. For example, atmospheric absorption (AtmAbsorp) 716 can be absorption units (Au). As another example, minimum slant distance (MinSlantDist) 720 can be in feet. The X axes of graphs 700 are in time.

With the maximum sound pressure level LAmax being recorded by each microphone for an entire arrival or departure, the process can identify which time instance in graphs 700 should be correlated to the ground truth for maximum sound pressure level LAmax to train machine learning models. In identifying the time instance, the process determines which time instance should be selected.

Heuristics searching can be performed to identify the best matching time instance. In the illustrative example, the best matching time instance is a time instance in which the slant distance to the microphone is below a threshold and selected parameters remain relatively stable with no radical changes. In this example, parameters that are relatively stable can be referred to as stable parameters. Stable parameters can be present when a moving average of the selected parameter in graph 700 are within a threshold.

In this illustrative example, time window 722 is used as part of a search to identify a best matching time instance for the selected parameters in graphs 700.

These different parameters are examples of parameters in other illustrative examples, the selection of the particular time instance can involve analyzing other numbers of parameters. For example, graphs 700 can include 50 selected parameters, 200 selected parameters, 750 selected parameters or other number of parameters in other illustrative examples.

In this example, a heuristic search algorithm using Auto Regressive Integrated Moving Average (ARIMA)-like sliding window approach can be used. With this example the average value for each parameter is compared with the value of that parameter at each time instance included in the window to determine whether parameters are stable. With this process, the search can begin from the time instance where the slant distance between the microphone and aircraft is a minimum and that search expands on both sides of this time instance where the slant distance between the microphone and aircraft is a minimum. The search ends as soon as the slant distance is the minimum or in the neighborhood of the minimum where all the selected parameters are stable. For example, the selected parameters can be considered to be stable when the values of the selected parameters do not exceed the moving average.

Figure 8:
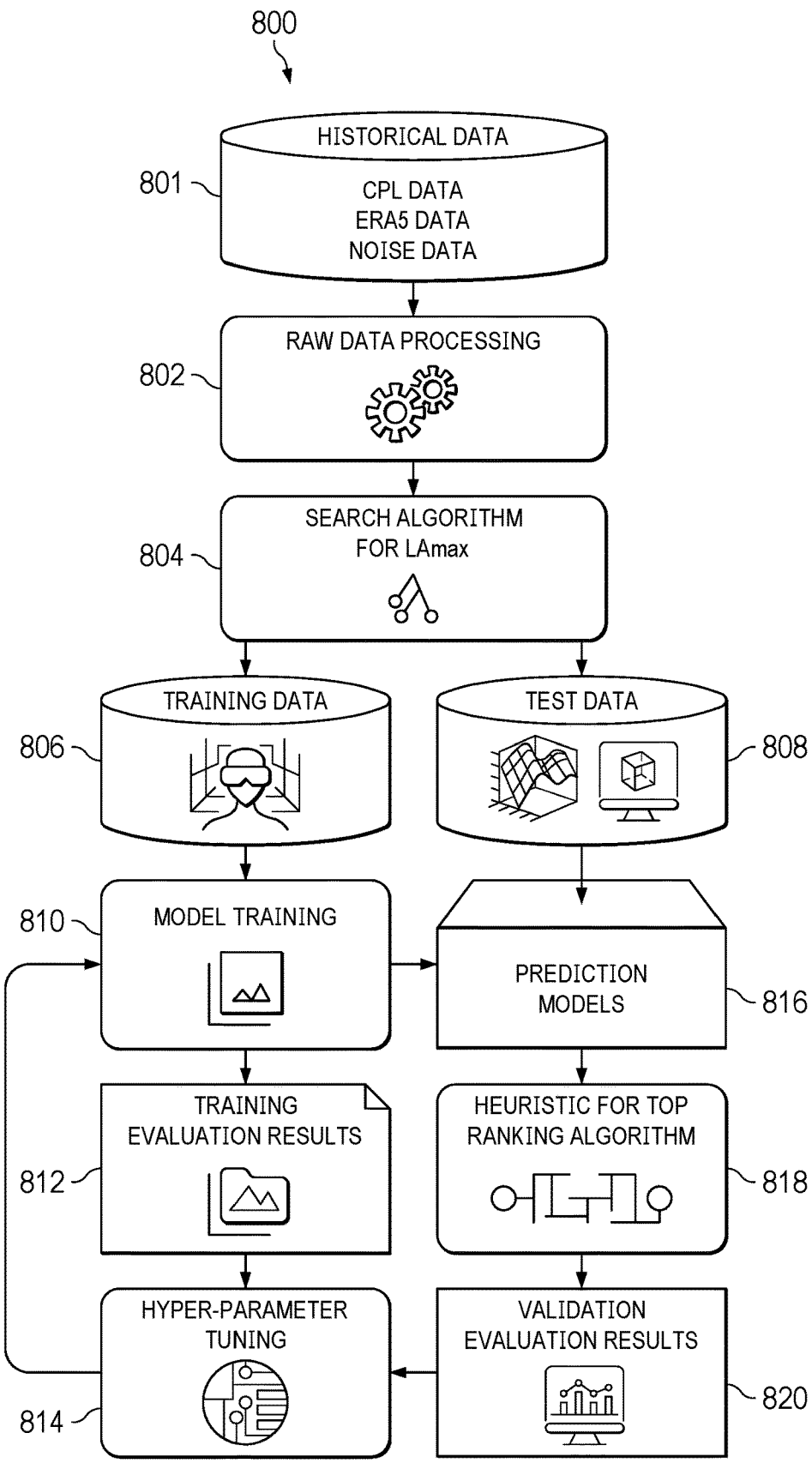
FIG. 8 is an illustration of a machine learning pipeline in accordance with an illustrative embodiment.

Turning next to FIG. 8, an illustration of a machine learning pipeline is depicted in accordance with an illustrative embodiment. In this illustrative example, machine learning pipeline 800 is an example the part you train machine learning models to predict maximum sound pressure levels.

As depicted, historical data 801 can include sensor data in the form of continuous parameter (CPL) data, ERA5 weather data, and airport data including noise data generated from microphones measuring sound. In this example, sound measurements of maximum sound pressure levels are removed as historical data 801 and used as labels in the training data.

Machine learning pipeline 800 performs raw data processing 802. With raw data processing 802, raw data in historical data 801 can be processed for use by search algorithm for LAmax 804. Raw data processing 802 can place raw data in historical data 801 into a form that can be used for training machine learning models. This processing can include, for example, imputing values for missing parameters, computing additional parameters not found in historical data 801, selecting parameters that have an impact on sound pressure level, removing repetitive parameters, and performing dimensionality reduction to obtain a desired number of selected parameters for use in training.

This data can be placed into data structures such as tables. Each row in the table represents a time instance and each column represents a selected parameter.

In machine learning pipeline 800, search algorithm for LAmax 804 identifies time instances where the maximum sound pressure level (LAnax) is present. This identification can be performed for each microphone and each flight to create datasets for training data 806 and test data 808. Training data 806 is used in model training 810 to train multiple machine learning models. These machines learning models are different types of machine learning using the same training dataset and training data 806. In other words, the machine learning models are all trained using the same training data.

Training evaluation results 812 can be analyzed and used to perform hyperparameter tuning 814. With hyperparameter tuning 814 additional model training can be performed until training evaluation results 812 provide some desired level of performance.

Model training 810 results in prediction models 816 which are machine learning models that have been trained to predict sound pressure levels. Prediction models 816 can be tested using test data 808.

With these predictions, heuristic for top ranking algorithm 818 can be used to select the top ranking algorithm (prediction model) in prediction models 816. Heuristic for top ranking algorithm 818 can result in validation evaluation results 820 used to select the top ranking prediction model. For example, validation evaluation results 820 can include mean error and standard deviation for each prediction model in prediction models 816 from generating predictions using test data 808. In this example, mean error and standard deviation are test results.

Further, hyperparameter tuning 814 can also be performed based on validation evaluation results 820. Hyperparameters 324 can be adjusted based on validation evaluation results 820. The final training model after validation can be used for testing.

Figure 9:
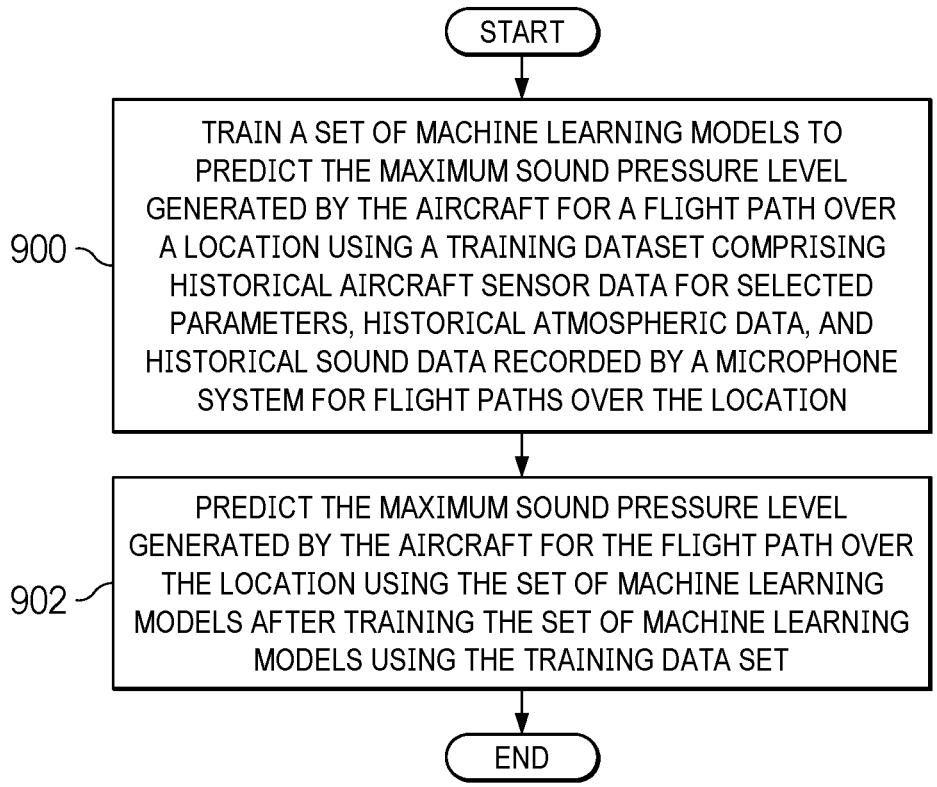
FIG. 9 is an illustration of a flowchart of a process for training a set of machine learning models to predict a maximum sound pressure level in accordance with an illustrative embodiment.

With reference to FIG. 9, an illustration of a flowchart of a process for training a set of machine learning models to predict a maximum sound pressure level is depicted in accordance with an illustrative embodiment. The process illustrated in FIG. 9 can be implemented using computer system 212 and controller 214 in FIG. 2. For example, the process can be implemented in controller 214 in computer system 212 in FIG. 2.

As depicted, the process begins by training a set of machine learning models to predict the maximum sound pressure level generated by the aircraft for a flight path over a location using a training dataset comprising historical aircraft sensor data for selected parameters, historical atmospheric data, and historical sound data recorded by a microphone system for flight paths over the location (operation 900). The process predicts the maximum sound pressure level generated by the aircraft for the flight path over the location using the set of machine learning models after training the set of machine learning models using the training dataset (operation 902). The process terminates thereafter.

Figure 10:
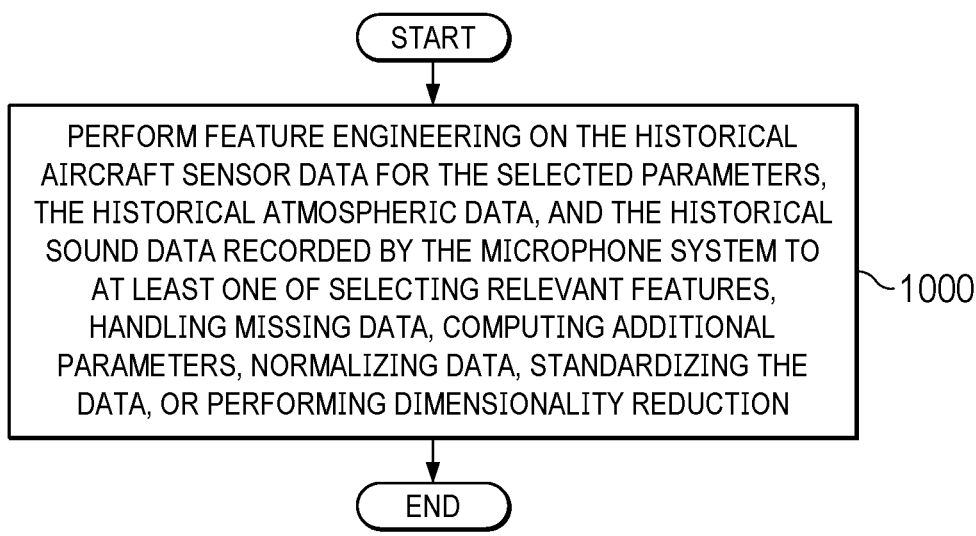
FIG. 10 is an illustration of a flowchart of a process for performing feature engineering on historical sensor data in accordance with an illustrative embodiment.

With reference now to FIG. 10, an illustration of a flowchart of a process for performing feature engineering on historical sensor data is depicted in accordance with an illustrative embodiment. The operations in this figure are examples of additional operations that can be used within the operations in the process in FIG. 9.

The process performs feature engineering on the historical aircraft sensor data for the selected parameters, the historical atmospheric data, and the historical sound data recorded by the microphone system to at least one of selecting relevant features, handling missing data, computing additional parameters, normalizing data, standardizing the data, or performing dimensionality reduction (operation 1000). The process terminates thereafter.

Figure 11:
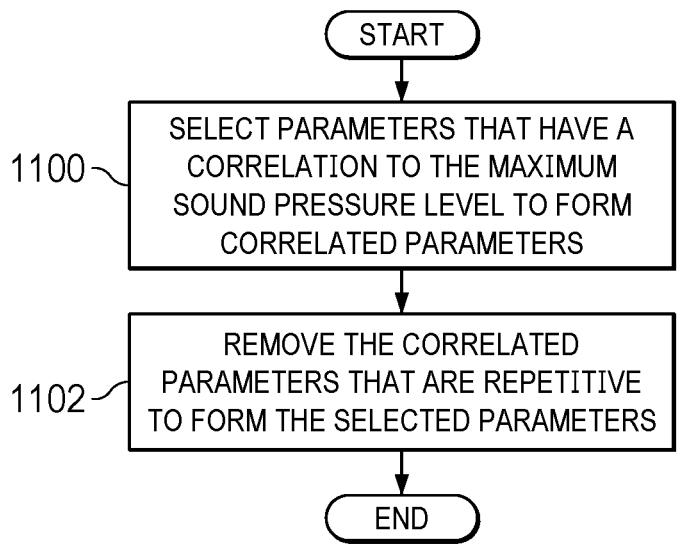
FIG. 11 is an illustration a flowchart of a process for selecting parameters in accordance with an illustrative embodiment.

With reference now to FIG. 11, an illustration a flowchart of a process for selecting parameters is depicted in accordance with an illustrative embodiment. The operations in this figure are examples of additional operations that can be used within the operations in the process in FIG. 9.

The process selects parameters that have a correlation to the maximum sound pressure level to form correlated parameters (operation 1100). The process removes the correlated parameters that are repetitive to form the selected parameters (operation 1102). The process terminates thereafter.

Figure 12:
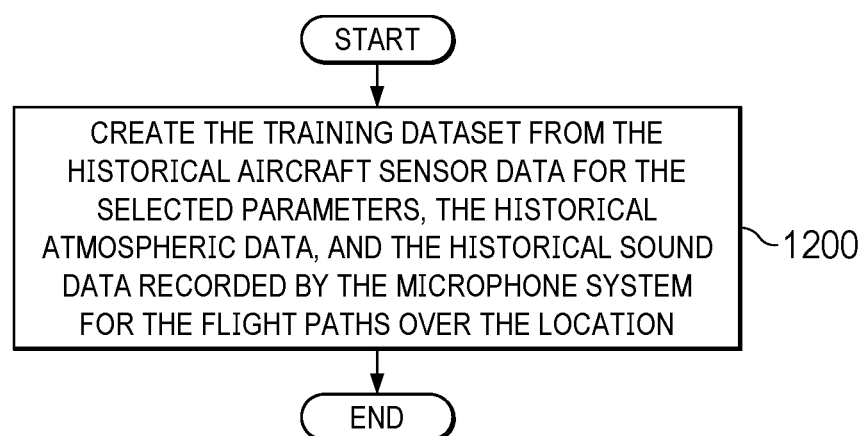
FIG. 12 is an illustration a flowchart of a process for creating a training dataset from sensor data in accordance with an illustrative embodiment.

With reference now to FIG. 12, an illustration a flowchart of a process for creating a training dataset from sensor data is depicted in accordance with an illustrative embodiment. The operation in this figure are examples of an additional operation that can be used within the operations in the process in FIG. 9.

The process creates the training dataset from the historical aircraft sensor data for the selected parameters, the historical atmospheric data, and the historical sound data recorded by the microphone system for the flight paths over the location (operation 1200). The process terminates thereafter.

In this example, the training dataset comprises groups of data. Each group of data in the groups of data is for a flight in the flights and includes the maximum sound pressure levels detected by microphones in the microphone system and the selected parameters corresponding to the time instances for the maximum sound pressure levels for the flight. The maximum sound pressure levels can be used as labels for the selected parameters and the historical atmospheric data.

Figure 13:
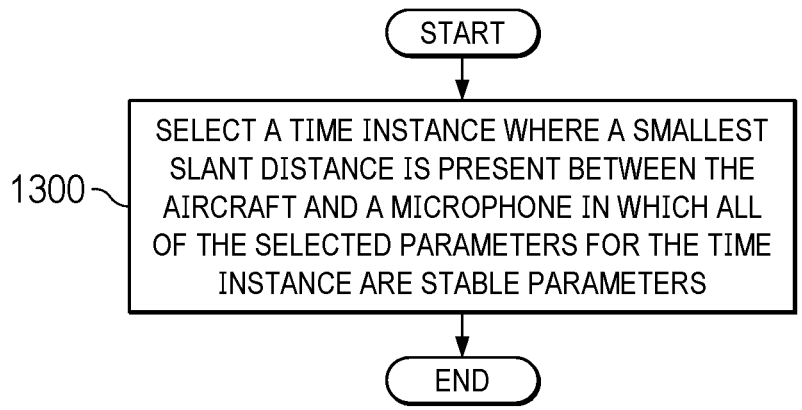
FIG. 13 is an illustration a flowchart of a process for selecting a time instance in accordance with an illustrative embodiment.

With reference now to FIG. 13, an illustration a flowchart of a process for selecting a time instance is depicted in accordance with an illustrative embodiment. The process in FIG. 13 is an example of one implementation for operation 1200 in FIG. 12.

The process selects a time instance where a smallest slant distance is present between the aircraft and a microphone in which all of the selected parameters for the time instance are stable parameters (operation 1300). The process terminates thereafter.

Figure 14:
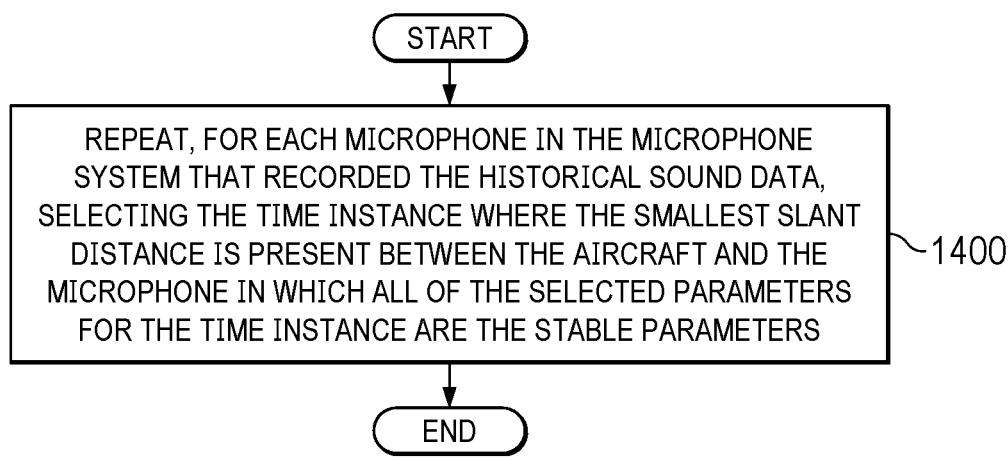
FIG. 14 is an illustration a flowchart of a process for selecting additional time instances in accordance with an illustrative embodiment.

With reference now to FIG. 14, an illustration a flowchart of a process for selecting additional time instances is depicted in accordance with an illustrative embodiment. The operations in this figure are examples of additional operations that can be used within the operations in the process in FIG. 13.

The process repeats, for each microphone in the microphone system that recorded the historical sound data, selecting the time instance where the smallest slant distance is preset between the aircraft and the microphone in which all of the selected parameters for the time instance are stable parameters (operation 1400). The process terminates thereafter.

Figure 15:
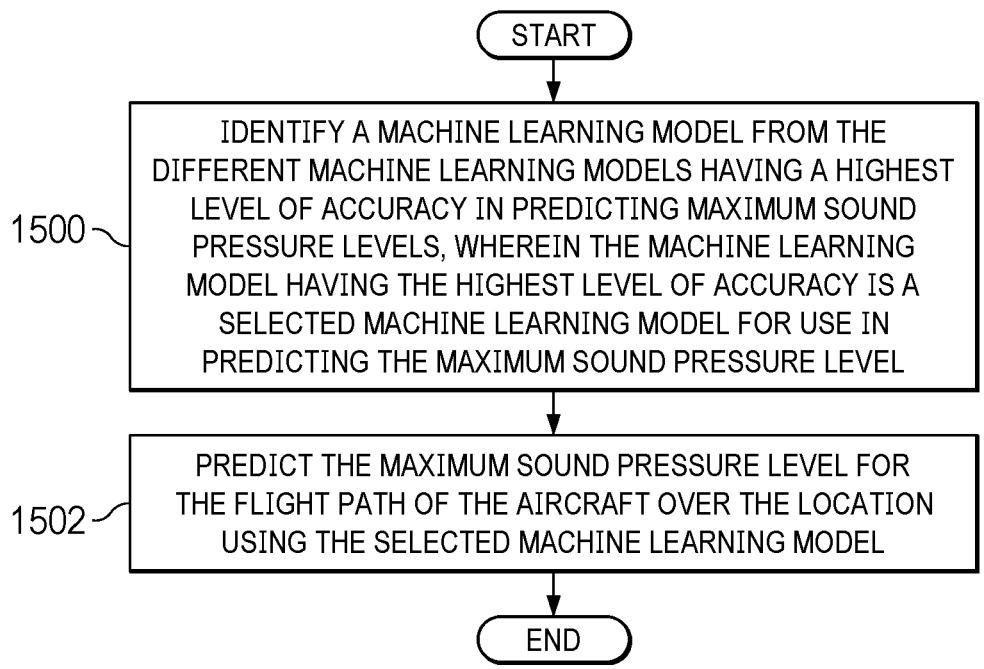
FIG. 15 is an illustration of a flowchart of a process for identifying a machine learning model in accordance with an illustrative embodiment.

With reference now to FIG. 15, an illustration of a flowchart of a process for identifying a machine learning model is depicted in accordance with an illustrative embodiment. The operations in this figure are examples of additional operations that can be used within the operations in the process in FIG. 9.

The process identifies a machine learning model from the different machine learning models having a highest level of accuracy in predicting maximum sound pressure levels, wherein a machine learning model having the highest level of accuracy is a selected machine learning model for use in predicting the maximum sound pressure level (operation 1500). The process predicts the maximum sound pressure level for the flight path of the aircraft over the location using the selected machine learning model (operation 1502). The process terminates thereafter. Operation 1502 is an example of an implementation of operation 902 in FIG. 9.

Figure 16:
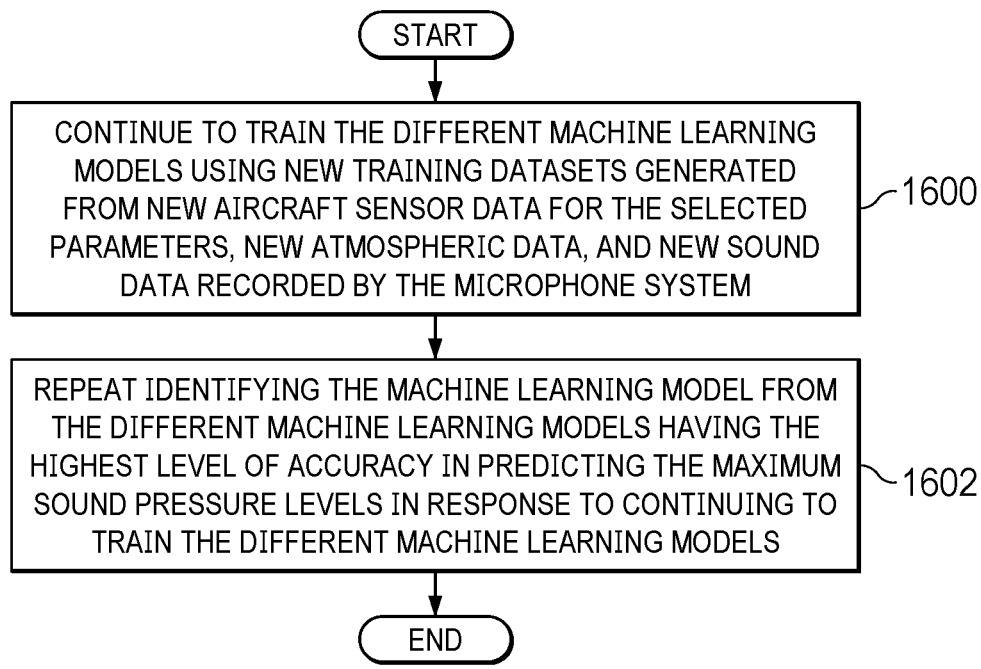
FIG. 16 is an illustration of a flowchart of a process for continuing to train different machine learning models in accordance with an illustrative embodiment.

With reference now to FIG. 16, an illustration of a flowchart of a process for continuing to train different machine learning models is depicted in accordance with an illustrative embodiment. The operations in this figure are examples of additional operations that can be used within the operations in the process in FIG. 15.

The process continues to train the different machine learning models using new training datasets generated from new aircraft sensor data for the selected parameters, new atmospheric data, and new sound data recorded by the microphone system (operation 1600). The process repeats identifying the machine learning model from the different machine learning models having the highest level of accuracy in predicting the maximum sound pressure levels in response to continuing to train the different machine learning models (operation 1602). The process terminates thereafter.

Figure 17:
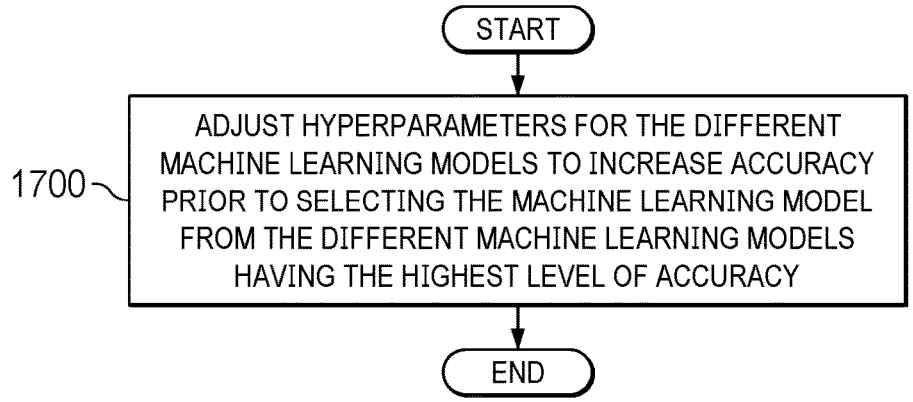
FIG. 17 is an illustration of a flowchart of a process for adjusting hyperparameters for the different machine learning models in accordance with an illustrative embodiment.

With reference now to FIG. 17, an illustration of a flowchart of a process for adjusting hyperparameters for the different machine learning models is depicted in accordance with an illustrative embodiment. The operation in this figure is an example of an additional operation that can be used within the operations in the process in FIG. 15.

The process adjusts hyperparameters for the different machine learning models to increase accuracy prior to selecting the machine learning model from the different machine learning models having the highest level of accuracy (operation 1700). The process terminates thereafter.

Figure 18:
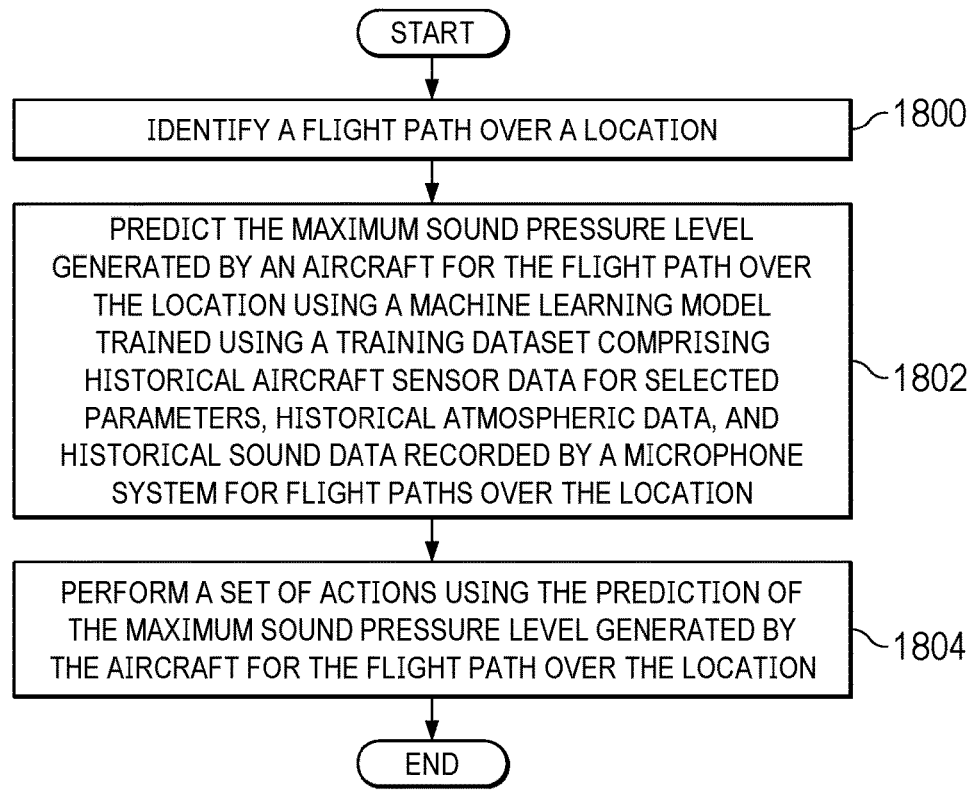
FIG. 18 is an illustration of a flowchart of a process for predicting a maximum sound pressure level in accordance with an illustrative embodiment. identifying a flight path in accordance with an illustrative embodiment.

With reference to FIG. 18, an illustration of a flowchart of a process for predicting a maximum sound pressure level is depicted in accordance with an illustrative embodiment. The process illustrated in FIG. 18 can be implemented using computer system 212 and controller 214 in FIG. 2. For example, the process can be implemented in controller 214 in computer system 212 in FIG. 2.

As depicted, the process begins by identifying a flight path over a location (operation 1800). The process predicts the maximum sound pressure level generated by an aircraft for the flight path over the location using a machine learning model trained using a training dataset comprising historical aircraft sensor data for selected parameters, historical atmospheric data, and historical sound data recorded by a microphone system for flight paths over the location (operation 1802). The process performs an action using a prediction of the of the maximum sound pressure level generated by the aircraft for a flight path over the location (operation 1804). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
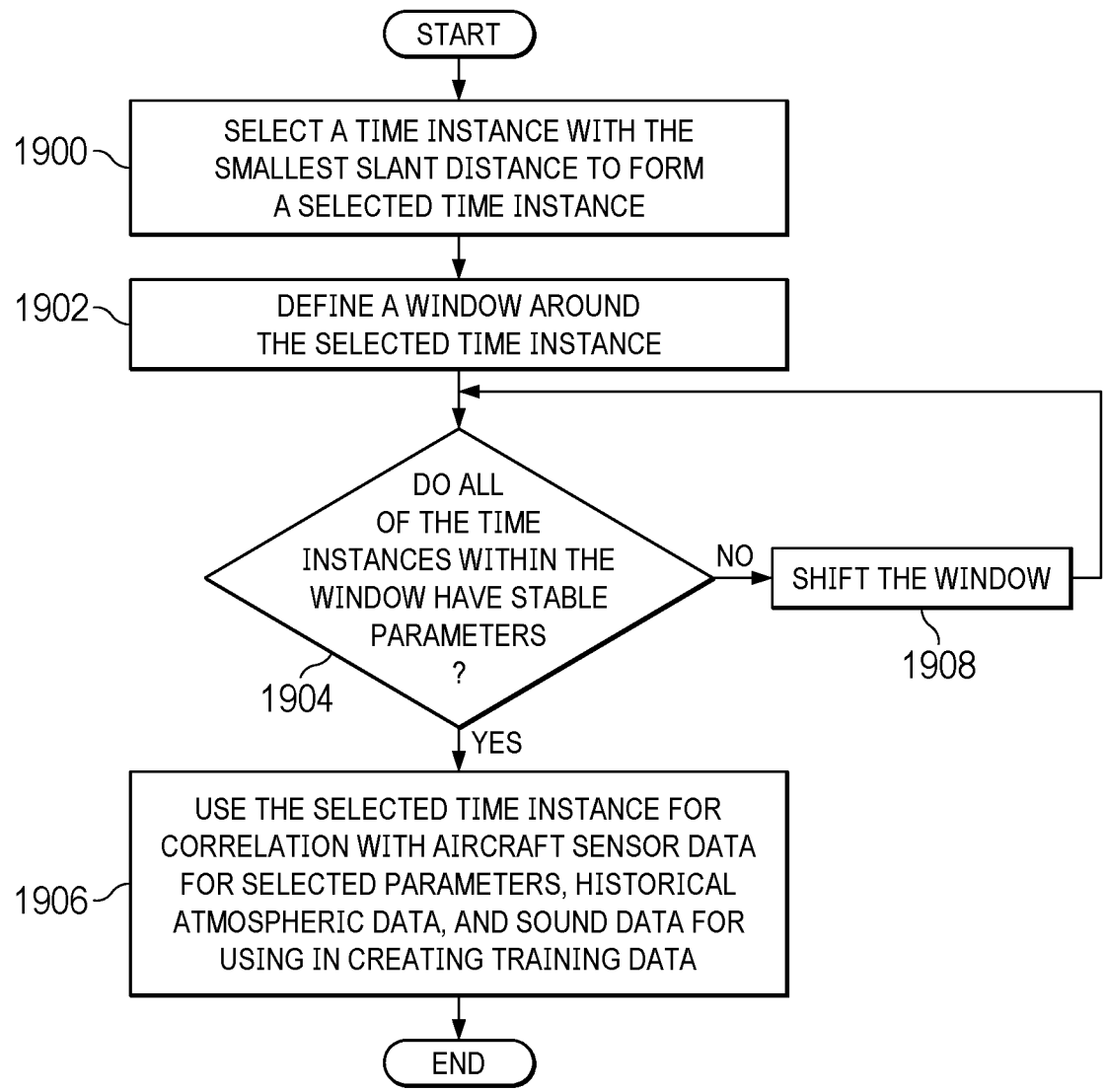
FIG. 19, an illustration of a flowchart of a process for identifying time instances for training data in accordance with an illustrative embodiment.

With reference to FIG. 19, an illustration of a flowchart of a process for identifying time instances for training data is depicted in accordance with an illustrative embodiment. The process illustrated in FIG. 19 is an example of one implementation for operation 1300 in FIG. 13.

The process begins by selecting a time instance with a smallest slant distance to form a selected time instance (operation 1900). The process defines a window around the selected time instance (operation 1902). In operation 1902, selected time instance is in the center of the window or as close to the center as possible. The size of the time window can be a default or preselected size such as 3, 5, or 7 time instances wide. Although odd numbered time instances are shown, other examples can use windows with even numbered instances.

The process then determines whether all of the time instances within the window have stable parameters (operation 1904). If all of the time instances within window have stable parameters, the process uses the selected time instance for correlation with aircraft sensor data for selected parameters, historical atmospheric data, and sound data to for using in creating training data (operation 1906). The process terminates thereafter. The selected time instance in operation 1906 is for a single flight. In operation 1906, this data can be associated with a label the is the maximum pressure level value.

With reference again to operation 1904, if the smallest slant distance where stable parameters are present is not less than the threshold, the process shifts the window (operation 1908) with the process then returning to operation 1904. The window can be shifted in either direction. In operation 1908, the window can also be changed in size.

Figure 20:
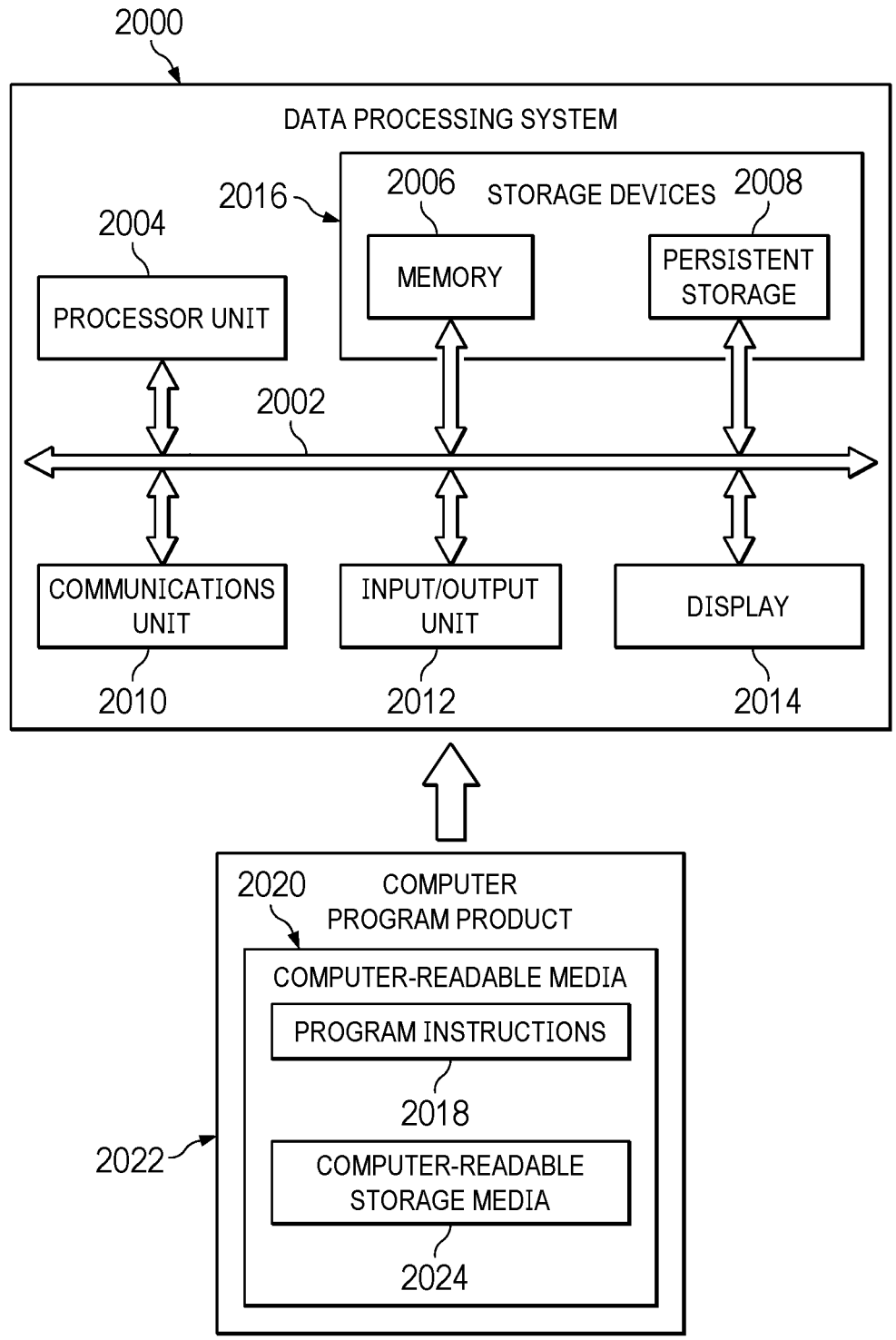
FIG. 20 is an illustration of a block diagram of a data processing system in accordance with an illustrative embodiment.

Turning now to FIG. 20, an illustration of a block diagram of a data processing system is depicted in accordance with an illustrative embodiment. Data processing system 2000 can be used to implement server computer 104, server computer 106, client devices 110, in FIG. 1. Data processing system 2000 can also be used to implement computer system 212 in FIG. 2. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 can take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 can provide a connection for user input through at least one of a keyboard, a mouse, or some other suitable input device. Further, input/output unit 2012 can send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which can be located in a memory, such as memory 2006.

These instructions are program instructions and are also referred to as program code, computer usable program code, or computer-readable program code that can be read and executed by a processor in processor unit 2004. The program instructions in the different embodiments can be embodied on different physical or computer-readable storage media, such as memory 2006 or persistent storage 2008.

Program instructions 2018 are located in a functional form on computer-readable media 2020 that is selectively removable and can be loaded onto or transferred to data processing system 2000 for execution by processor unit 2004. Program instructions 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program instructions 2018 rather than a media that propagates or transmits program instructions 2018. Computer readable storage media 2024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2018 can be transferred to data processing system 2000 using a computer-readable signal media. The computer-readable signal media are signals and can be, for example, a propagated data signal containing program instructions 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program instructions 2018 can be located in computer-readable media 2020 in the form of a single storage device or system. In another example, program instructions 2018 can be located in computer-readable media 2020 that is distributed in multiple data processing systems. In other words, some instructions in program instructions 2018 can be located in one data processing system while other instructions in program instructions 2018 can be located in one data processing system. For example, a portion of program instructions 2018 can be located in computer-readable media 2020 in a server computer while another portion of program instructions 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, can be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program instructions 2018.

Some features of the illustrative examples are described in the following clauses. These clauses are examples of features not intended to limit other illustrative examples.

Clause 1

A method for predicting a maximum sound pressure level generated by an aircraft, the method comprising:
 training a set of machine learning models to predict the maximum sound pressure level generated by the aircraft for a flight path over a location using a training dataset comprising historical aircraft sensor data for selected parameters, historical atmospheric data, and historical sound data recorded by a microphone system for flight paths over the location; and
 predicting the maximum sound pressure level generated by the aircraft for the flight path over the location using the set of machine learning models after training the set of machine learning models using the training dataset.

Clause 2

The method according to clause 1 further comprising:
 performing feature engineering on the historical aircraft sensor data for the selected parameters, the historical atmospheric data, and the historical sound data recorded by the microphone system to at least one of selecting relevant features, handling missing data, computing additional parameters, normalizing data, standardizing the data, or performing dimensionality reduction.

Clause 3

The method according to one of clauses 1 or 2 further comprising:
  selecting parameters that have a correlation to the maximum sound pressure level to form correlated parameters; and
  removing the correlated parameters that are repetitive to form the selected parameters.

Clause 4

The method according to one of clauses 1, 2, or 3 further comprising:
  creating the training dataset from the historical aircraft sensor data for the selected parameters, the historical atmospheric data, and the historical sound data recorded by the microphone system for the flight paths over the location.

Clause 5

The method according to clause 4, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances for maximum sound pressure levels for the flight.

Clause 6

The method according to clause 4, wherein creating the training dataset from the historical aircraft sensor data comprises:
  selecting a time instance where a smallest slant distance is present between the aircraft and a microphone in which all of the selected parameters for the time instance are stable parameters.

Clause 7

The method according to clause 6, wherein all of the selected parameters are the stable parameters when a moving average of each selected parameter in the selected parameters is within a threshold.

Clause 8

The method according to clause 6 further comprising:
  repeating, for each microphone in the microphone system that recorded the historical sound data, selecting the time instance where the smallest slant distance is preset between the aircraft and the microphone in which all of the selected parameters for the time instance are the stable parameters.

Clause 9

The method according to one of clauses 1, 2, 3, 4, 5, 6, 7, or 8, wherein the set of machine learning models comprises a single machine learning model.

Clause 10

The method according to one of clauses 1, 2, 3, 4, 5, 6, 7, 8, or 9, wherein the set of machine learning models comprises different machine learning models and further comprising:
  identifying a machine learning model from the different machine learning models having a highest level of accuracy in predicting maximum sound pressure levels, wherein the machine learning model having the highest level of accuracy is a selected machine learning model for use in predicting the maximum sound pressure level; and
  wherein predicting the maximum sound pressure level for the flight path of the aircraft over the location comprises:
    predicting the maximum sound pressure level for the flight path of the aircraft over the location using the selected machine learning model.

Clause 11

The method according to clause 10 further comprising:
  continuing to train the different machine learning models using new training datasets generated from new aircraft sensor data for the selected parameters, new atmospheric data, and new sound data recorded by the microphone system; and
  repeating identifying the machine learning model from the different machine learning models having the highest level of accuracy in predicting the maximum sound pressure levels in response to continuing to train the different machine learning models.

Clause 12

The method according to clause 10 further comprising:
  adjusting hyperparameters for the different machine learning models to increase accuracy prior to selecting the machine learning model from the different machine learning models having the highest level of accuracy.

Clause 13

The method according to clause 10, wherein the different machine learning models are selected from at least one of a linear machine learning model, a nonlinear machine learning model, an ensemble machine learning model system, or a neural network model.

Clause 14

The method according to one of clauses 1, 2, 3, 4, 5, 6, 7, 8, 9, 10, 11, 12, or 13, wherein the flight path is for one of a departing flight from an airport and an arriving flight to the airport.

Clause 15

The method according to one of clauses 1, 2, 3, 4, 5, 6, 7, 8, 9, 10, 11, 12, 13, or 14, wherein the training dataset comprises the historical aircraft sensor data for the selected parameters, the historical atmospheric data, and the historical sound data for the flight paths recorded for at least one of an aircraft type, a tail number, or an airline.

Clause 16

The method according to one of clauses 1, 2, 3, 4, 5, 6, 7, 8, 9, 10, 11, 12, 13, 14, or 15, wherein the training dataset further comprises airport data.

Clause 17

A method for predicting a maximum sound pressure level, the method comprising:
  identifying a flight path over a location; and
  predicting the maximum sound pressure level generated by an aircraft for the flight path over the location using a machine learning model trained using a training dataset comprising historical aircraft sensor data for selected parameters, historical atmospheric data, and historical sound data recorded by a microphone system for flight paths over the location.

Clause 18

The method according to clause 17 further comprising:
  performing a set of actions using the prediction of the maximum sound pressure level generated by the aircraft for the flight path over the location.

Clause 19

The method according to clause 18, wherein the set of actions is selected from at least one of planning a flight over the location using the prediction of the of the maximum sound pressure level generated by the aircraft for the flight path over the location, determining compliance with a regulation regarding the maximum sound pressure level for the location, changing the flight path, logging maximum sound pressure level, change a flight time for using the flight path, identifying changes to aircraft configuration for the aircraft, or automatically changing the flight path.

Clause 20

A machine learning system for sound pressure level prediction comprising:
a computer system; and
a maximum sound pressure level predictor in the computer system, wherein the maximum sound pressure level predictor is configured to:
train a set of machine learning models to predict a maximum sound pressure level generated by an aircraft for a flight path over a location using a training dataset comprising historical aircraft sensor data for selected parameters, historical atmospheric data, and historical sound data recorded by a microphone system for flight paths over the location; and
predict the maximum sound pressure level generated by the aircraft for the flight path over the location using the set of machine learning models after training the set of machine learning models using the training dataset.

Clause 21

The machine learning system according to clause 20, wherein the maximum sound pressure level predictor is configured to:
select the selected parameters from parameters that have a correlation to the maximum sound pressure level to form correlated parameters; and
remove the correlated parameters that are repetitive to form the selected parameters.

Clause 22

The machine learning system according to one of clauses 20 or 21, wherein the maximum sound pressure level predictor is configured to:
create the training dataset from the historical aircraft sensor data for the selected parameters, the historical atmospheric data, and the historical sound data recorded by the microphone system for the flight paths over the location.

Clause 23

The machine learning system according to clause 22, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances for maximum sound pressure levels for the flight.

Clause 24

The machine learning system according to clause 22, wherein in creating the training dataset from the historical aircraft sensor data, the historical atmospheric data, and the historical sound data recorded by the microphone system for the flight paths over the location, the maximum sound pressure level predictor is configured to:
select a time instance where both a smallest slant distance is preset between the aircraft and a microphone in which all of the selected parameters for the time instance are stable parameters.

Clause 25

The machine learning system according to clause 24, wherein all of the selected parameters are the stable parameters when a moving average of each selected parameter in the selected parameters is within a threshold.

Clause 26

The machine learning system according to clause 24, wherein the maximum sound pressure level predictor is configured to:
repeat, for each microphone in the microphone system that recorded the historical sound data, selecting the time instance where the smallest slant distance is preset between the aircraft and the microphone and in which all of the selected parameters for the time instance are the stable parameters.

Clause 27

The machine learning system according to one of clauses 20, 21, 22, 23, 24, 25, or 26, wherein the set of machine learning models comprises a single machine learning model.

Clause 28

The machine learning system according to one of clauses 20, 21, 22, 23, 24, 25, 26, or 27, wherein the set of machine learning models comprises different machine learning models and wherein the maximum sound pressure level predictor is configured to:
identify a machine learning model from the different machine learning models having a highest level of accuracy in predicting the maximum sound pressure levels, wherein the machine learning model having the highest level of accuracy is a selected machine learning model for use in predicting the maximum sound pressure level; and
wherein predicting the maximum sound pressure level for the flight path of the aircraft over the location, the maximum sound pressure level predictor is configured to:
predict the maximum sound pressure level for the flight path of the aircraft over the location using the selected machine learning model.

Clause 29

The machine learning system according to clause 28, wherein the maximum sound pressure level predictor is configured to:
continue to train the different machine learning models using new training datasets generated from new aircraft sensor data for the selected parameters, new atmospheric data, and new sound data recorded by the microphone system; and
repeat identifying the machine learning model from the different machine learning models having the highest level of accuracy in predicting the maximum sound pressure levels in response to continuing to train the different machine learning models.

Clause 30

The machine learning system according to clause 28, wherein the different machine learning models are selected from a linear machine learning model, a nonlinear machine learning model, an ensemble machine learning model system, or a neural network model.

Clause 31

The machine learning system according to one of clauses 20, 21, 22, 23, 24, 25, 26, 27, 28, 29, or 30, wherein the flight path is for one of a departing flight from an airport or an arriving flight to the airport.

Clause 32

The machine learning system according to one of clauses 20, 21, 22, 23, 24, 25, 26, 27, 28, 29, 30, or 31, wherein the training dataset comprises the historical aircraft sensor data for the selected parameters, the historical atmospheric data, and the historical sound data for the flight paths recorded for at least one of an aircraft type, a tail number, or an airline.

Clause 33

The machine learning system according to one of clauses 20, 21, 22, 23, 24, 25, 26, 27, 28, 29, 30, 31, or 32, wherein the training dataset further comprises airport data.

Clause 34

A computer program product for predicting a maximum sound pressure level generated by an aircraft, the computer program product comprising a computer readable storage medium having program instructions embodied therewith, the program instructions executable by a computer system to cause the computer system to perform a method of:

identifying a flight path over a location; and predicting the maximum sound pressure level generated by the aircraft for the flight path over the location using a machine learning model trained using a training dataset comprising historical aircraft sensor data for selected parameters, historical atmospheric data, and historical sound data recorded by a microphone system for flight paths over the location.

Thus, illustrative examples provide a method, apparatus, system, and computer program product for predicting noise in the form of maximum sound pressure levels. The prediction of maximum sound pressure levels is performed using a machine learning model that has been trained using historical aircraft sensor data for selected parameters, historical atmospheric data, and historical sound data reported by microphone system for flight paths over a location. In these illustrative examples, a prediction of a maximum sound pressure level can be made for a flight path over the location.

With these predictions with increased accuracy in predicting maximum sound pressure levels, airlines can plan flight paths that can reduce undesired noise in areas over and around an airport. Further, air navigation service providers (ANSPs) can more easily enforce noise-reduced arrival and departure procedures and penalizing airlines for their flights that produce noise above mandated thresholds for maximum sound pressure levels. With more accurate predictions using machine learning models, meeting thresholds for noise levels can occur more easily for airlines.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for predicting a maximum sound pressure level generated by an aircraft, the method comprising:

creating a training dataset from raw data comprising: historical aircraft sensor data for selected parameters, historical atmospheric data, and historical sound data recorded by a microphone system for flight paths over a location, by:

selecting parameters, comprising a correlation, for changing over time, to the maximum sound pressure level, from the raw data and thereby forming correlated parameters;

forming selected parameters by filtering the correlated parameters; and examining the correlated parameters and identifying stable parameters comprising a moving average within a first threshold and a slant distance between the aircraft and a microphone in the microphone system is below a second threshold;

training, using the training dataset comprising, a set of machine learning models to predict the maximum sound pressure level generated by the aircraft for a flight path over the location; and subsequently predicting, using the set of machine learning models, the maximum sound pressure level generated by the aircraft for the flight path over the location.

2. The method of claim 1 further comprising:

performing feature engineering on; the historical aircraft sensor data for the selected parameters, the historical atmospheric data, and the historical sound data recorded by the microphone system for at least one of: selecting relevant features, handling missing data, computing additional parameters, normalizing data, or standardizing the data.

3. The method of claim 1, further comprising filtering the the correlated parameters that repetitive using a dimensionality reduction algorithm.

4. The method of claim 1, further comprising:

creating the training dataset using heuristics searching.

5. The method of claim 4, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances for maximum sound pressure levels for the flight.

6. The method of claim 4, wherein creating the training dataset from the historical aircraft sensor data further comprises:

selecting a time instance where a smallest slant distance is present between the aircraft and a microphone in which all of the selected parameters for the time instance are stable parameters.

7. The method of claim 6, wherein all of the selected parameters are the stable parameters when a moving average of each selected parameter in the selected parameters is within a threshold.

8. The method of claim 6, further comprising:

repeating, for each microphone in the microphone system that recorded the historical sound data, selecting the time instance where the smallest slant distance is preset between the aircraft and the microphone in which all of the selected parameters for the time instance are the stable parameters.

9. The method of claim 1, wherein the set of machine learning models comprises a single machine learning model.

10. The method of claim 1, wherein the set of machine learning models comprises hyperparameters.

11. The method of claim 10, further comprising:
training different machine learning models using new training datasets generated from new aircraft sensor data for the selected parameters, new atmospheric data, and new sound data recorded by the microphone system; and
identifying a machine learning model from the different machine learning models having a highest level of accuracy in predicting maximum sound pressure levels in response to continuing to train the different machine learning models.

12. The method of claim 11, further comprising:
adjusting the hyperparameters for the different machine learning models to increase accuracy prior to selecting a machine learning model comprising a highest level of accuracy from among the different machine learning models.

13. The method of claim 11, wherein the different machine learning models are selected from at least one of a linear machine learning model, a nonlinear machine learning model, an ensemble machine learning model system, or a neural network model.

14. The method of claim 1, wherein the flight paths comprise one of a departing flight from an airport or an arriving flight to the airport.

15. The method of claim 1, wherein the training dataset comprises the historical aircraft sensor data for the selected parameters, the historical atmospheric data, and the historical sound data for the flight paths recorded for at least one of an aircraft type, a tail number, or an airline.

16. The method of claim 1, wherein the training dataset further comprises airport data.

17. A method for predicting a maximum sound pressure level, the method comprising:
creating a training dataset from raw data comprising: historical aircraft sensor data for selected parameters, historical atmospheric data, and historical sound data recorded by a microphone system for flight paths over a location, by:
selecting parameters, comprising a correlation, for changing over time, to the maximum sound pressure level, from the raw data and thereby forming correlated parameters;
forming selected parameters by filtering the correlated parameters; and
examining the correlated parameters and identifying stable parameters comprising a moving average within a first threshold and a slant distance between an aircraft and a microphone in the microphone system is below a second threshold;
identifying a flight path in the flight paths over the location; and
predicting the maximum sound pressure level generated by an aircraft for the flight path over the location using a machine learning model trained using the training dataset.

18. The method of claim 17, further comprising:
performing a set of actions using a prediction of the maximum sound pressure level generated by the aircraft for the flight path over the location.

19. The method of claim 18, wherein the set of actions is selected from at least one of: planning a flight over the location using the prediction of the of the maximum sound pressure level generated by the aircraft for the flight path over the location, determining compliance with a regulation regarding the maximum sound pressure level for the location, changing the flight path, logging maximum sound pressure level, change a flight time for using the flight path, identifying changes to aircraft configuration for the aircraft, or automatically changing the flight path.

20. A machine learning system configured to predict a sound pressure level, wherein the machine learning system comprises:
a computer system that comprises program instructions; and
a maximum sound pressure level prediction model in the computer system, wherein the maximum sound pressure level prediction model is configured to:
create a training dataset from raw data that comprises: historical aircraft sensor data for selected parameters, historical atmospheric data, and historical sound data recorded by a microphone system for flight paths over a location, based upon the program instructions being configured to:
select parameters, comprising a correlation, for changing over time, to a maximum sound pressure level, from the raw data and thereby forming correlated parameters;
form selected parameters by filtering in the correlated parameters; and
examine the correlated parameters and identifying stable parameters comprising a moving average within a first threshold and a slant distance between an aircraft and a microphone in the microphone system is below a second threshold;
train a set of machine learning models to predict a maximum sound pressure level generated by an aircraft for a flight path over a location using the training dataset;
select a top heuristically ranked machine learning model based upon validation evaluations of predictions from each machine learning model in the set of machine learning models; and
predict, with the top heuristically ranked machine learning model, the maximum sound pressure level generated by the aircraft for the flight path over the location.

21. The machine learning system of claim 20, wherein the maximum sound pressure level prediction model is further configured to filter the correlated parameters that are repetitive based upon a dimensionality reduction algorithm.

22. The machine learning system of claim 20, wherein the maximum sound pressure level prediction model is further configured to create the training dataset based upon a heuristics search.

23. The machine learning system of claim 22, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances for maximum sound pressure levels for the flight.

24. The machine learning system of claim 22, wherein the maximum sound pressure level prediction model is further configured to select a time instance where both a smallest slant distance is preset between the aircraft and a microphone in which all of the selected parameters for the time instance are stable parameters.

25. The machine learning system of claim 24, further comprising the computer system configured to analyze evaluation validations based upon hyperparameter tuning.

26. The machine learning system of claim 24, wherein the maximum sound pressure level prediction model is further configured to:

repeat, for each microphone in the microphone system that recorded the historical sound data, selecting the time instance where the smallest slant distance is preset between the aircraft and the microphone and in which all of the selected parameters for the time instance are the stable parameters.

27. The machine learning system of claim 20, wherein the set of machine learning models comprises a single machine learning model.

28. The machine learning system of claim 20, wherein the set of machine learning models comprises different machine learning models and wherein the maximum sound pressure level prediction model is further configured to:
identify a machine learning model from the different machine learning models having a highest level of accuracy in predicting the maximum sound pressure level, wherein the machine learning model having the highest level of accuracy is a selected machine learning model for use in predicting the maximum sound pressure level; and
wherein predicting the maximum sound pressure level for the flight path of the aircraft over the location, the maximum sound pressure level prediction model is configured to:
predict the maximum sound pressure level for the flight path of the aircraft over the location using the selected machine learning model.

29. The machine learning system of claim 28, wherein the maximum sound pressure level prediction model is further configured to:
continue to train the different machine learning models using new training datasets generated from new aircraft sensor data for the selected parameters, new atmospheric data, and new sound data recorded by the microphone system; and
repeat identifying the machine learning model from the different machine learning models having the highest level of accuracy in predicting the maximum sound pressure levels in response to continuing to train the different machine learning models.

30. The machine learning system of claim 28, wherein the different machine learning models are selected from: a linear machine learning model, a nonlinear machine learning model, an ensemble machine learning model system, or a neural network model.

31. The machine learning system of claim 20, wherein the flight paths comprise one of a departing flight from an airport or an arriving flight to the airport.

32. The machine learning system of claim 20, wherein the training dataset comprises the historical aircraft sensor data for the selected parameters, the historical atmospheric data, and the historical sound data for the flight paths recorded for at least one of an aircraft type, a tail number, or an airline.

33. The machine learning system of claim 20, wherein the training dataset further comprises airport data.

34. A computer program product configured to predict a maximum sound pressure level generated by an aircraft, wherein the computer program product comprises a non-transitory computer readable storage medium that comprises program instructions embodied therewith and configured to:
identify a flight path over a location;
create a training dataset from raw data that comprises: historical aircraft sensor data for selected parameters, historical atmospheric data, and historical sound data recorded by a microphone system for flight paths over a location, based upon the program instructions being configured to:
select parameters, comprising a correlation, for changing over time, to the maximum sound pressure level, from the raw data and thereby forming correlated parameters;
form selected parameters by filtering the correlated parameters; and
examine the correlated parameters and identifying stable parameters comprising a moving average within a first threshold and a slant distance between the aircraft and a microphone in the microphone system is below a second threshold;
train multiple machine learning models to predict a maximum sound pressure level generated by an aircraft for a flight path over a location using the training dataset; and
predict the maximum sound pressure level generated by the aircraft for the flight path over the location based upon a machine learning model trained based upon the training dataset.

* * * * *

UNITED STATES PATENT AND TRADEMARK OFFICE
CERTIFICATE OF CORRECTION

PATENT NO. : 12,175,875 B2  
APPLICATION NO. : 17/805371  
DATED : December 24, 2024  
INVENTOR(S) : Samet M. Ayhan and Mikhail Y. Danilin Page 1 of 1

It is certified that error appears in the above-identified patent and that said Letters Patent is hereby corrected as shown below:

In the Claims

Column 26, Line 27, change "on; the historical" to -- on: the historical --
       Lines 34-35, change "filtering the the correlated" to -- filtering the correlated --
       Line 35, change "that repetitive" to -- that are repetitive --
Column 27, Line 63, change "prediction of the of the maximum" to -- prediction of the maximum --
Column 28, Line 1, change "change a flight" to -- changing a flight --

Signed and Sealed this  
Fourth Day of February, 2025

Coke Morgan Stewart  
*Acting Director of the United States Patent and Trademark Office*